(12) United States Patent
Umamoto

(10) Patent No.: US 10,048,711 B2
(45) Date of Patent: Aug. 14, 2018

(54) SYSTEM, METHOD, AND PROGRAM FOR CONSERVING ENERGY

(75) Inventor: Eiichi Umamoto, Tokyo (JP)

(73) Assignee: Nihon Techno Co., Ltd. (JP)

( * ) Notice: Subject to any disclaimer, the term of this patent is extended or adjusted under 35 U.S.C. 154(b) by 338 days.

(21) Appl. No.: 14/395,955

(22) PCT Filed: May 31, 2012

(86) PCT No.: PCT/JP2012/064163
§ 371 (c)(1),
(2), (4) Date: Oct. 21, 2014

(87) PCT Pub. No.: WO2013/179459
PCT Pub. Date: Dec. 5, 2013

(65) Prior Publication Data
US 2015/0081130 A1  Mar. 19, 2015

(51) Int. Cl.
*G05F 1/66* (2006.01)
*H02J 3/14* (2006.01)
*G05B 15/02* (2006.01)

(52) U.S. Cl.
CPC .............. *G05F 1/66* (2013.01); *G05B 15/02* (2013.01); *H02J 3/14* (2013.01);
(Continued)

(58) Field of Classification Search
CPC .... G05F 1/66; G05B 15/02; H02J 3/14; H02J 2003/143; Y02B 70/3225; Y02B 70/3266; Y04S 20/222; Y04S 20/242
See application file for complete search history.

(56) References Cited

U.S. PATENT DOCUMENTS 4,090,088 A * 5/1978 McMahon .............. H02J 3/14
307/38

4,694,192 A * 9/1987 Payne ..................... H02J 3/14
307/34

(Continued)

FOREIGN PATENT DOCUMENTS

DE     4229277 A1   4/1993
EP     0208597 A1   1/1987
(Continued)

OTHER PUBLICATIONS

Machine translation of EP 1729223 A2.*
(Continued)

*Primary Examiner* — Thomas C Lee
*Assistant Examiner* — Tri T Nguyen
(74) *Attorney, Agent, or Firm* — Harness, Dickey & Pierce, P.L.C.

(57) ABSTRACT

Operations of nuclear power plants have been suspended in various locations due to the Great East Japan Earthquake. However, it is not necessarily essential to undertake strict emergency energy saving measures at all times. In order to solve the aforementioned problems, the present invention proposes an energy saving system comprising an electrical power consumption quantity information acquisition unit for acquiring information on the quantity of electrical power consumed for a plurality of electric devices, a target demand value storage unit for storing a target demand value for electrical power consumption, a supply surplus indicator acquisition unit for acquiring indicators of surplus electric power supplied by an electric power company having control over electrical power within a certain region, and a control unit for controlling the plurality of electric devices based on the acquired supply surplus indicators, the acquired electrical power consumption quantity information, and the stored target demand value.

18 Claims, 20 Drawing Sheets

(52) U.S. Cl.
CPC ..... *H02J 2003/143* (2013.01); *Y02B 70/3225* (2013.01); *Y02B 70/3266* (2013.01); *Y04S 20/222* (2013.01); *Y04S 20/242* (2013.01)

(56) References Cited

U.S. PATENT DOCUMENTS

| | | | |
|---|---|---|---|
| 4,771,185 A | | 9/1988 | Feron et al. |
| 4,916,328 A | * | 4/1990 | Culp ........................ H02J 3/14 307/39 |
| 5,436,511 A | | 7/1995 | Nigawara et al. |
| 7,218,998 B1 | | 5/2007 | Neale |
| 8,239,073 B2 | * | 8/2012 | Fausak .................. G01D 4/002 700/276 |
| 2008/0264922 A1 | * | 10/2008 | Fosbinder ............ B23K 9/1006 219/133 |
| 2011/0181109 A1 | | 7/2011 | Huomo |
| 2012/0065792 A1 | * | 3/2012 | Yonezawa ................ H02J 3/14 700/291 |
| 2013/0144768 A1 | * | 6/2013 | Rohrbaugh ............ G06Q 10/06 705/34 |

FOREIGN PATENT DOCUMENTS

| | | |
|---|---|---|
| EP | 2400616 A2 | 12/2011 |
| JP | H01-157229 A | 6/1989 |
| JP | H05-083854 A | 4/1993 |
| JP | H05-103425 A | 4/1993 |
| JP | H10-234133 A | 9/1998 |
| JP | 2000-078748 A | 3/2000 |
| JP | 2002-027669 A | 1/2002 |
| JP | 2003-032887 A | 1/2003 |
| JP | 2004040956 A | 2/2004 |
| JP | 2005-033952 A | 2/2005 |
| JP | 2006-329468 A | 12/2006 |
| JP | 4442915 B1 | 3/2010 |
| TW | 201030348 A | 8/2010 |
| WO | WO-2005-029670 A1 | 3/2005 |
| WO | WO-2010-048993 A1 | 5/2010 |

OTHER PUBLICATIONS

Machine translation of JP2002051465, Power Supply Method, Power System Controller and Memory Medium, Feb. 15, 2002, 24 pages.*
Partial Supplementary European Search Report for Application No. EP 12877807.3 dated Jan. 15, 2016 (8 pages).
European Office Action for EP Application No. 12877807.3, dated May 18, 2018 (7 pages).

* cited by examiner

Fig. 6

| Difference value(s—x) | Electric power quantity subject to restriction control A (%) |
|---|---|
| ~0 | ※Processing shown in Fig. 2 is executed. |
| 0~2 | 10 |
| 2~4 | 15 |
| 4~ | 20 |

Fig. 9

| | Proximity to target demand value $(z(1+k)/y) \times 100(\%)$ | Percentage value for the electric power quantity subject to restriction control A(%) |
|---|---|---|
| x>s | | ※Processing shown in Fig. 2 is executed. |
| x≦s | ~50 | |
| | 50~70 | 10 |
| | 70~90 | 15 |
| | 90~ | 20 |

Fig. 10

| | Proximity to target demand value $(z(1+k)/y) \times 100(\%)$ | Difference value $(s-x)$ | Percentage value for the electric power quantity subject to restriction control A(%) |
|---|---|---|---|
| x>s | | | ※Processing shown in Fig. 2 is executed. |
| x≦s | ~50 | | |
| | 50~70 | 0~2 | 10 |
| | | 2~4 | 12 |
| | | 4~ | 14 |
| | 70~90 | 0~2 | 14 |
| | | 2~4 | 16 |
| | | 4~ | 18 |
| | 90~ | 0~2 | 18 |
| | | 2~4 | 19 |
| | | 4~ | 20 |

Fig. 14

| ID | Name and type | Installment floor | Installment space | Setting mode |
|---|---|---|---|---|
| A01 | PC01 | 1F | Conference room | |
| A02 | PC02 | 2F | Office | |
| A03 | PC03 | 2F | Office | |
| A04 | Lightning system01 | 1F | Reception room | |
| ⋮ | ⋮ | ⋮ | ⋮ | |
| A15 | Lightning system12 | 2F | Office | |
| A16 | Refrigerator01 | 2F | Kitchen | |
| A17 | TV01 | 2F | Lounge | |
| A18 | Audio set01 | 2F | Lounge | |
| A19 | Air conditioner01 | 1F | Conference room | Air supply mode |
| A20 | Air conditioner02 | 2F | Office | Cooling mode |
| A21 | Air conditioner03 | 2F | Lounge | Cooling mode |
| ⋮ | ⋮ | ⋮ | ⋮ | |

Fig. 17

| Priority of order | Percentage value for the electric power quantity subject to restriction control A(%) |
|---|---|
| 1 | 20 |
| 2 | 15 |
| 3 | 10 |
| 4~ | 0 |

SYSTEM, METHOD, AND PROGRAM FOR CONSERVING ENERGY

CROSS-REFERENCE TO RELATED APPLICATIONS

This application is a U.S. National Stage Application of International Application No. PCT/JP2012/064163 filed on May 31, 2012, and published in Japanese as WO 2013/179459 A1 on Dec. 5, 2013. The entire disclosure of the above application is incorporated herein by reference.

FIELD OF THE INVENTION

The present invention relates to an energy saving system, an energy saving method, and an energy saving program.

BACKGROUND OF THE INVENTION

Conventionally, energy saving systems for energy saving measures monitor electricity utilization statuses of electric devices, such as lightning systems for air conditioners, at all times and turn off power sources of the electric devices when the electrical power consumption quantity exceeds the predetermined thresholds, thereby allowing restriction of the electrical power consumption quantity. Such energy saving systems have been generally well known. Such saving energy devices are characterized in that controlling takes place automatically and with consideration to users' comfort.

In Japanese Published Unexamined Patent Application No. 2006-329468, an example of the demand control device controlling the total power usage of a plurality of air conditioning loads is described. Additionally, in Japanese Examined Patent Application Publication No. 4442915, an energy saving system that expressly selects a person that should undertake energy saving operations and allows improvement of user awareness regarding saving energy actions is disclosed.

SUMMARY OF THE INVENTION

Problems to be Solved by the Invention

Operations of nuclear power plants have been suspended in various locations due to the nuclear power plant accident resulting from the Great East Japan Earthquake. The electric power companies must overcome the aforementioned difficulties associated with power supply. However, even amid the tight power supply conditions mentioned above, it is not necessarily essential to undertake strict emergency energy saving measures at all times. It is acceptable simply not to exceed relevant supply capacity during peak hours. In reality, electricity users may often excessively undertake saving energy actions, even in cases in which such actions are not necessary. Excessive saving energy actions cause remarkable inconvenience to actual lives. And often, even in cases in which it is essential to promptly undertake energy saving actions, electricity users may tend to neglect doing so. As such, it is difficult to say that energy saving activities that match the reality of power supply systems have been undertaken.

In order to solve the aforementioned problems, the present invention proposes an energy saving system comprising an electrical power consumption quantity information acquisition unit for acquiring information on the quantity of electrical power consumed for a plurality of electric devices, a target demand value storage unit for storing a target demand value for electrical power consumption, a supply surplus indicator acquisition unit for acquiring indicators of surplus electric power supplied by an electric power company having control over electrical power within a certain region, and a control unit for controlling the plurality of electric devices based on the acquired supply surplus indicators, the acquired electrical power consumption quantity information, and the stored target demand value.

Effects of the Invention

According to the present invention having the primary configuration described above, it is possible to encourage electric power users, such as operators, to undertake energy saving actions in order to respond to electric supply surpluses of electric power companies that differ in different seasons, at different hours, etc. As a result, an environment allowing stable electricity supply by electric power companies can be preserved.

BRIEF DESCRIPTION OF THE DRAWINGS

FIG. 6 is a diagram showing an example of restriction control undertaken via the energy saving system of the second embodiment.

FIG. 9 is a diagram showing an example of restriction control undertaken via the energy saving system of the third embodiment.

FIG. 10 is a diagram showing another example of restriction control undertaken via the energy saving system of the third embodiment.

FIG. 14 is a diagram showing an example of database for groups stored in the energy saving system of the fourth embodiment.

FIG. 17 is a diagram showing an example of restriction control undertaken via the energy saving system of the energy saving system of the fifth embodiment.

DETAILED DESCRIPTIONS OF PREFERRED EMBODIMENTS

Embodiments of the present invention will be described hereinafter with reference to the drawings. The mutual relationship between the embodiments and claims is described as follows. A first embodiment will mainly describe the first, seventh, and thirteenth aspects of the present disclosure. A second embodiment will mainly describe the second, eighth, and thirteenth aspects of the present disclosure. A third embodiment will mainly describe the third, ninth, and thirteenth aspects of the present disclosure. A fourth embodiment will mainly describe the fourth, tenth, and thirteenth aspects of the present disclosure. A fifth embodiment will mainly describe the fifth, eleventh, and thirteenth aspects of the present disclosure. A sixth embodiment will mainly describe the sixth, twelfth, and thirteenth aspects of the present disclosure. The present invention is not limited to the above embodiments and may be embodied in various forms without exceeding the scope thereof.

First Embodiment

Concept of First Embodiment

According to an energy saving system of a first embodiment, target demand values for electrical power consumption of homes, workplaces, facilities, etc. are stored and information on the quantity of electrical power consumed for a plurality of electric devices is acquired. At the same time, indicators of surplus electric power supplied by an electric power company having control over electrical power within a certain region are acquired. For example, the information on current supply quantity compared with the remaining electrical power that can be supplied and remaining supply capacity are acquired. Based on the acquired supply surplus indicators, the acquired electrical power consumption quantity information, and the stored target demand value, the plurality of electric devices of homes, workplaces, facilities, etc. can be controlled. Such configuration allows users of electric devices for which energy saving control takes place to undertake energy saving actions based on the electricity utilization statuses of overall regions of electric power companies as well as on their own. Therefore, it is possible to promote efficiency and optimization for energy saving and electric power saving efforts.

Functional Configuration of First Embodiment

Figure 1:
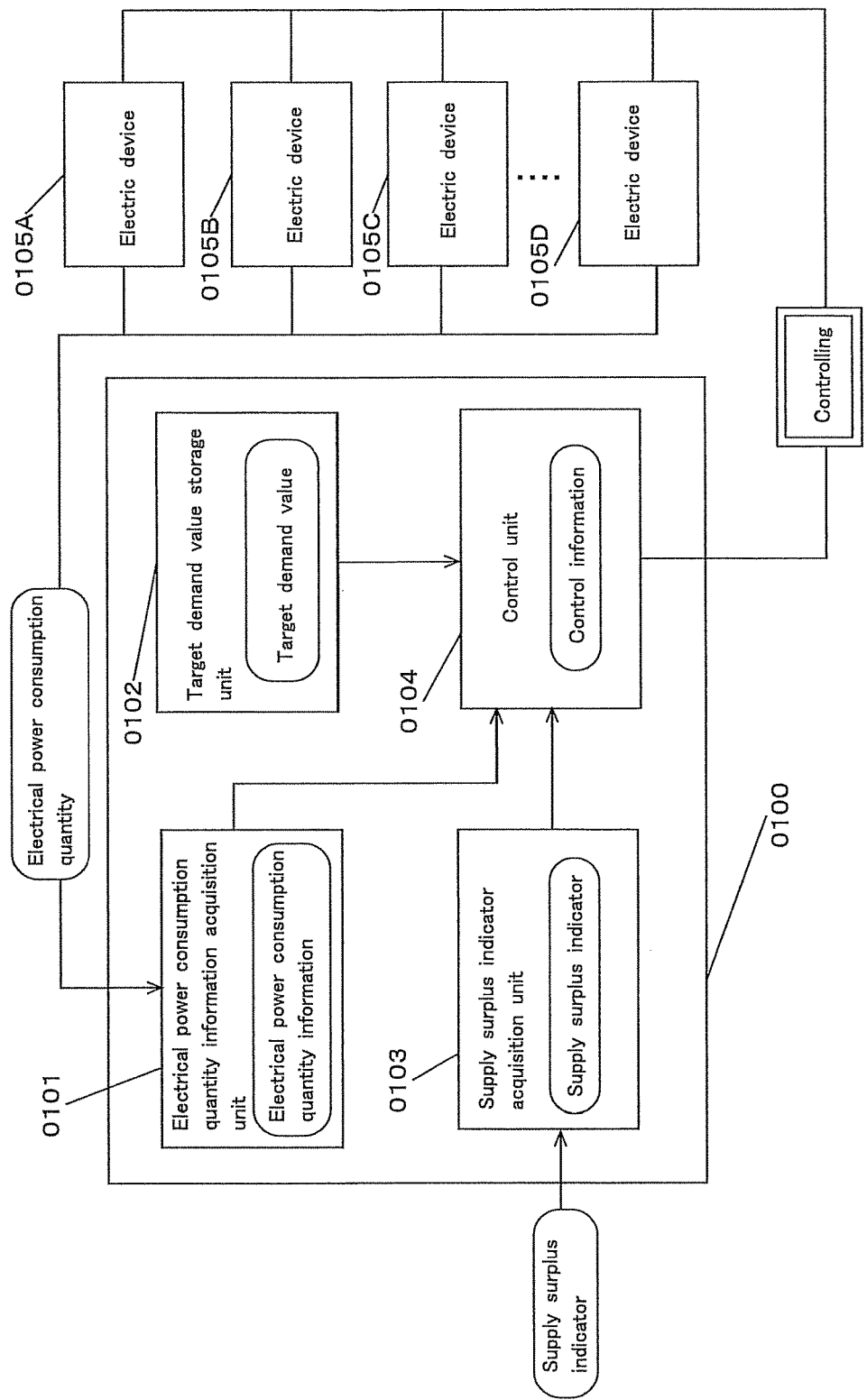
FIG. 1 is a diagram showing an example of functional block diagram of an energy saving system of a first embodiment.

FIG. 1 is a diagram showing an example of functional block diagram of an energy saving system of a first embodiment. As described in FIG. 1, an "energy saving system" (0100) comprises an "electrical power consumption quantity information acquisition unit" (0101), a "target demand value storage unit" (0102), a "supply surplus indicator acquisition unit" (0103), and a "control unit" (0104), and controls an "electric device" (0105) as needed.

Note that, the functional blocks of the integrated interface devices can be implemented by hardware, software, or both hardware and software. Specifically, in the case of using a computer, the respective units are implemented by the hardware configured by a CPU, a main memory, a bus, a secondary storage device (e.g., a hard disk or a nonvolatile memory, a storage media such as CD-ROM or DVD-ROM, or a reading drive for the above media), an input device for an inputting information, a printing device, display device, a sensor, a measuring instrument (e.g., a power meter), a clock, electric power lines, communication lines, other peripheral devices, an interface for such other peripheral devices and communication interface, a driver program for controlling the aforementioned hardware, and other application programs. The CPU executes operation in accordance with the program developed on the main memory, so that processing and storing of the data inputted through the input device, the interface, or the like and stored in the memory or the hardware are carried out, and instructions to control the hardware and software are generated. Moreover, the present invention can be implemented not only as an apparatus but also as a method thereof.

Moreover, some of the present invention can be configured as software. Furthermore, a software product and a storage medium in which such product is included in a recoding medium fall within the technical scope of the present invention as a matter of course. (The same applies throughout the entire specification.)

The "electrical power consumption quantity information acquisition unit" retains the function for acquiring information on the quantity of electrical power consumed for a plurality of electric devices. More concretely, for example, the "electrical power consumption quantity information acquisition unit" acquires information on electrical power consumption quantity of a plurality of electric devices measured using a power meter. It is desirable to obtain information on electrical power consumption quantity at predetermined intervals of about 5 to 60 minutes, which are relatively short intervals. (The length of such intervals depends on design.) Moreover, it is acceptable to obtain information on electrical power consumption quantity to be acquired on a piece-by-piece basis, classified by individual electric device, for a plurality of electric devices, or on a collective basis for such plurality as a whole.

In case that the aforementioned information has been obtained on a collective basis for a plurality of electric devices, a plurality of electric devices would constitute a unit for controlling.

Moreover, in addition to information on electrical power consumption quantity, a configuration is possible in which information on identification IDs and setting modes for electric devices is also obtained. (Identification IDs will be explained in detail in the section on a fourth embodiment.) Such information can be used as determination data upon selecting electric devices to be restricted via the control unit described below.

The "target demand value storage unit" retains the function for storing a target demand value as a target value for the quantity of electrical power consumed for a plurality of electric devices. A target demand value can be configured to be changed via an operation input device of the energy saving system, or it can be configured to be changed externally via a wired or wireless communication line. Furthermore, a target demand value can be configured to be established and changed by remote control using a center device other than the energy saving system. Additionally, it is acceptable to establish a target demand value in different ways depending on the time of day (i.e., morning, daytime, or night), depending on intervals (i.e., 30-minute intervals or 1-hour intervals), or the like.

The "supply surplus indicator acquisition unit" retains the function for acquiring indicators of surplus electric power supplied by an electric power company having control over electrical power within a certain region. The term "supply surplus indicator" refers to a certain indicator that shows the supply surplus of an electric power company. For example, more specifically, such indicator may be computed as follows: The value resulting when the expected maximum electrical power consumption quantity within all regions of an electric power company is divided by the maximum electrical power supply (i.e., the quantity that can be supplied per unit time for the entirety of the regions of the electric power company), and the resultant is deducted from 1.

In addition, for example, a value of zero for the supply surplus indicator means that the relevant electric power company will no longer provide electric power. If the aforementioned conditions take place, voltage and frequency of the electric power provided by an electric power company begin to decrease and neither normal power generation nor normal power transmission can take place. As a result, the risk of blackout for all relevant regions will increase. That is to say, the higher the supply surplus indicator, the greater the quantity of electric power provided by an electric power company. As a result, consumers are less likely to face the imminent need for energy saving actions. And the lower the supply surplus indicator, the lower the quantity of electric power provided by an electric power company and the risk of blackout for all relevant regions will increase. As a result, consumers are more likely to face the imminent need for energy saving actions. For example, it is said that if a supply surplus indicator falls by approximately 8%, the risk of blackout in a given region will become apparent. In order to avoid the aforementioned situation, there is a great need for individual electric power users to undertake energy saving actions, thereby allowing restriction of the total electrical power consumption quantity within a region, and a substantial need for an electric power company to preserve a stable power supply surplus. In recent years, in order to avoid the risk of blackout, a system for planned power outage has been adopted, but the adverse effect of such system on industries and lives is immeasurable.

In addition, an electric power company discloses electrical power consumption quantity per unit time (e.g., 5 minutes, 1 hour, or the like), the amount of electric power that can be provided per unit time, and a supply surplus indicator computed based on such amount. The expression "acquiring indicators of surplus electric power" specifically refers to acquisition of a supply surplus indicator disclosed as described above via electric communication lines. A supply surplus indicator may be obtained on an hourly basis, when the result values are disclosed, or it may be obtained at 5-minute intervals, when preliminary figures are disclosed. It is desirable to establish shorter intervals for a supply surplus indicator, so as to allow energy saving activities to be more properly aligned with regional power supply situations. However, giving consideration to actual conditions of electric power usage by users, it is acceptable to establish longer intervals for a supply surplus indicator.

The times (i.e., intervals) at which a supply surplus indicator is obtained can be configured so that they can be changed via the energy saving system as needed.

The "control unit" retains the function for controlling the plurality of electric devices based on the acquired supply surplus indicators, the acquired electrical power consumption quantity information, and the stored target demand value. The expression "controlling the plurality of electric devices based on the acquired supply surplus indicators, the acquired electrical power consumption quantity information, and the stored target demand value" used above refers to a case in which controlling takes place with the use of 3 values. However, relevant cases are not limited to those in which all 3 of the aforementioned values are constantly in use.

Figure 2:
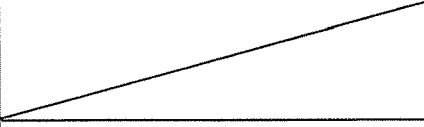
FIG. 2 is a diagram showing an example of progression of the process for controlling of the energy saving system of the first embodiment.

More concretely, in a situation in which electric power supply by an electric power company is normal and supply surplus is not in imminent danger, the control unit is used to control electrical power consumption quantity based on a target demand value. FIG. 2 is a diagram showing an example of progression of the process for controlling of the energy saving system of the first embodiment.

Therein, "z" represents electrical power consumption quantity, "y" represents the target demand value, "z (1+k)" represents the electrical power consumption quantity that can be expected for the period for which the target demand value has been established, and "A" represents electric power to be restricted during the same period. In case that there is a sufficient surplus of the electrical power consumption quantity in relation to the target demand value, controlling for electric power saving will not be undertaken in the first place. On the other hand, in case that the electrical power consumption quantity is closer to the target demand value, if the risk of exceeding the target demand value becomes high (that is to say, in case that the computer predicts that electrical power consumption quantity during a certain unit time will exceed the target demand value), controlling will be implemented so the target demand value is not exceeded. For example, in case that it has been predicted that consumption will exceed 90% of the target demand value, a method for commencing controlling can be implemented, and the aforementioned percentage can be changed as needed. In addition, "k" is a coefficient determined based on setup environment, (i.e., relevant homes, offices, and workplaces), types of electric devices, weather on a given day, etc., and it is a design value. In any case, the energy saving system of the first embodiment is characterized in that controlling takes place using expected electric power quantity instead of actual electrical power consumption quantity at a given time.

In case that electric power supply by an electric power company has been impeded, controlling will take place so as to restrict electrical power consumption quantities of electric devices. Preferably, in case that expected electrical power consumption quantity is sufficiently low in relation to a target demand value, there will be less controlling of electric power saving, or no controlling of the same. In case that expected electrical power consumption quantity of electric devices is relatively close to a target demand value, controlling will take place so as to reduce electrical power consumption quantities for electric devices to a relatively greater extent.

In case that electric power supply by an electric power company has been impeded, a supply surplus indicator at the time at which controlling of electrical power consumption quantities of electric devices via the energy saving system of the first embodiment commences is called a "low supply surplus value." As described above, in general, it is said that in case that a supply surplus indicator falls below 8%, the risk of blackout will become apparent. The aforementioned value can be also changed depending upon the regional electricity supply-demand environment. Thus, a low supply surplus value ranging from 1% to 15% (and, if possible, from about 8% to 12%) can be established in a manner that allows it to be alterable. Such configuration allows users to undertake the energy saving actions that can immediately reflect the electricity supply-demand balance at a corresponding time.

The expression "controlling the plurality of electric devices" includes a situation in which off control of electric devices takes place. In addition to the method described above, for example, in the case of an electric device that can change electrical power consumption quantity based on the setting mode of such electric device, it is also possible to adopt a method for controlling that allows change of such setting mode. In regard to an electric device that allows restriction of electric power quantity outputted to a certain level, it is also possible to adopt a method for controlling that allows reduction of electrical power consumption quantity. As a specific example, in case that an electric device is a lightning system, such lightning system will be turned off for a predetermined number of hours. Additionally, in case that an electric device is an air conditioner, for example, a method for controlling in which off control of a compressor unit takes place and, during the period of such control, the condition of the corresponding air conditioner is changed to an air supply state without temperature regulation is possible. The aforementioned controls allow an air supply mode for an air conditioner to be established. In summer, room temperature naturally becomes slightly higher. In winter, room temperature naturally becomes slightly lower. Users of an electric device controlled by the energy saving system of the first embodiment can naturally gain a sense of energy saving through sensory awareness of the extent of room brightness, the air volume of an air supply mode, room temperature fluctuation, etc. Therefore, they will be able to recognize the need to undertake energy saving actions on such occasions.

Furthermore, another method for controlling can be also established so that some rather than all of a plurality of electric devices can be controlled. Adoption of the aforementioned method for controlling requires users to undertake voluntary energy saving actions for uncontrolled electric devices and allows them to enhance their energy saving awareness as a result.

For example, when off control of all electric devices is established, it is difficult for users to undertake energy saving actions voluntarily. However, in case that there exist other electric devices to be further controlled in addition to controlled electric devices, it is easy for users to undertake energy saving actions prior to controlling such other electric devices. Moreover, it is not required to extend any control lines from the energy saving system for every electric device. Therefore, it is also possible to restrict facility costs.

Moreover, there are electric devices for which a relatively low amount of electric power is necessary to save by controlling. In relation to the expression " . . . which a relatively low amount of electric power is necessary to save by controlling," it is possible to imagine a situation in which promotion of electric power saving would cause damage and increase inconvenience to a remarkable extent. Specific examples are factory facilities that make it difficult to resume operations due to suspension of refrigerators, elevators, water service pumps, etc. Additionally, there exist devices for which off control occurs suddenly. Examples of such devices are personal computers used for various types of information processing, and various forms of recording media that require use over a long period of time. Reasons for employing a configuration in which off control does not take place for every electric device include cases in which setup is possible such that not every electronic device is controlled. According to the energy saving system of the first embodiment, controlling takes place via use of a supply surplus indicator that cannot be controlled by users of electric devices. Therefore, in order to avoid a situation in which all electric devices are suddenly controlled at an unexpected time, it is useful to exercise partial control of electric devices.

Specific Configuration of Energy Saving System

Figure 3:
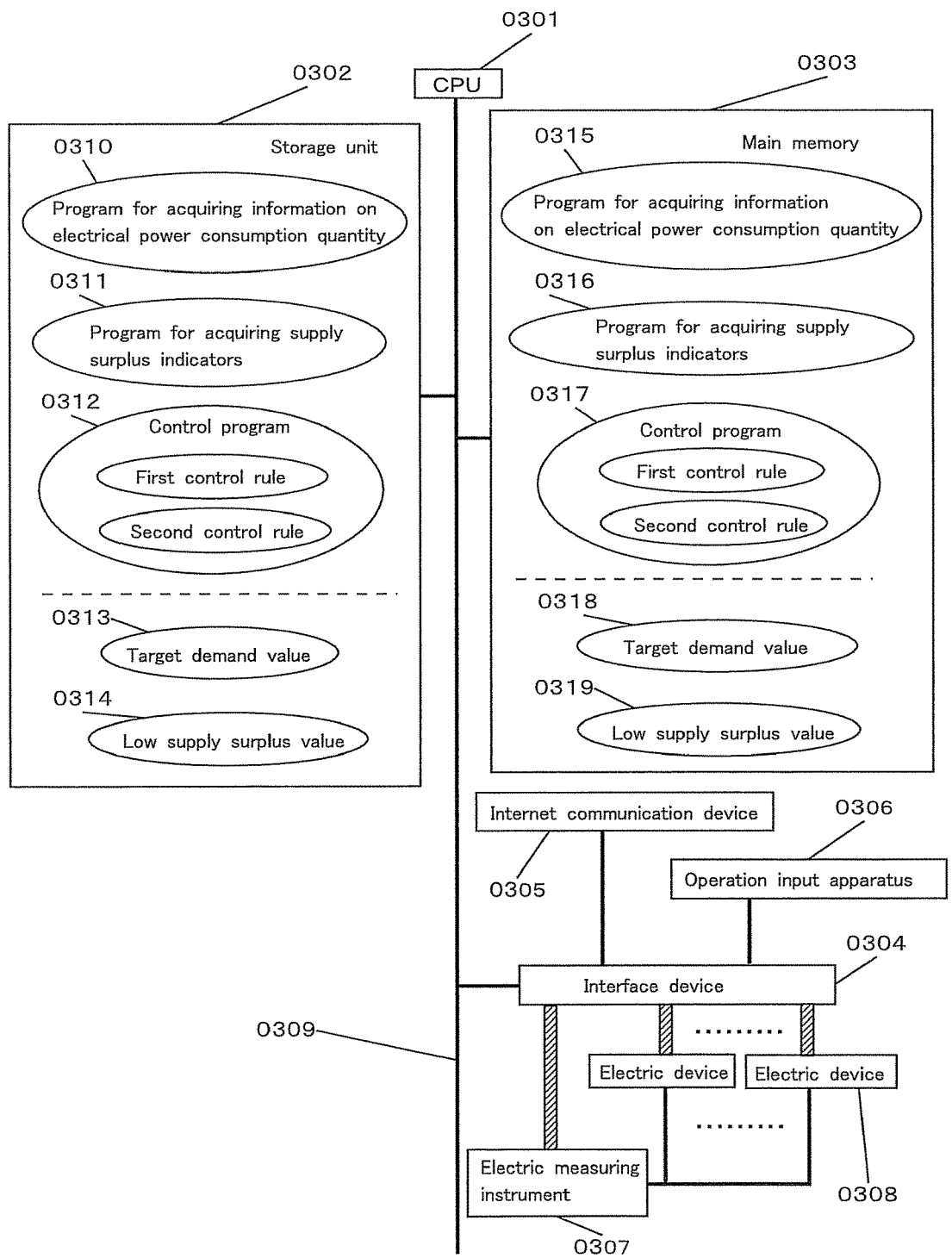
FIG. 3 is a schematic diagram showing an example of functional hardware configuration units of the energy saving system of the first embodiment.

FIG. 3 is a schematic diagram showing an example of functional hardware configuration units of the energy saving system of the first embodiment. Operations for hardware configuration units are explained hereinafter with reference to FIG. 3.

As illustrated in FIG. 3, the energy saving system comprises a "CPU" (0301), a "storage unit (storage medium)" (0302), a "main memory" (0303), and an "interface" (0304). Such interface allows transmission and reception of data signal, control signal, etc. relating to electric power consumption with an "Internet communication device" (0305), an "operation input apparatus" (0306), an "electric measuring instrument" (0307), and an "electric device" (0308). The aforementioned configuration is mutually connected by a "system bus" (0309) as a data communication path, and transmission, reception, and processing of information take place. The interface, the electric devices, and an electric measuring instrument are connected via a wired or wireless communication line. As a configuration using a communication line, it is also acceptable to use a form of power line communication (PLC) utilizing power lines.

Processing Via Electrical Power Consumption Quantity Information Acquisition Unit The CPU loads a program for acquiring information on electrical power consumption quantity, acquires information on electrical power consumption quantities of a plurality of electric devices from the electric measuring instrument via the interface, and stores such information at a predetermined address of the main memory. Acquisition of the information on electrical power consumption quantity can be configured to take place at 1-minute intervals using a clock (omitted in the figure) incorporated in the energy saving system. Moreover, based on the acquired electrical power consumption quantity information, the electrical power consumption quantity expected for a predetermined period specified in the storage unit (for which a target demand value is established) is computed.

Processing Via Supply Surplus Indicator Acquisition Unit

Subsequently, the CPU loads a Program for acquiring supply surplus indicators, acquires a supply surplus indicator disclosed by an electric power company via the interface, and stores such information at the predetermined address of the main memory. Acquisition of a supply surplus indicator can be configured to take place at 5-minute or 1-hour intervals based on a clock (omitted in the figure) incorporated in the energy saving system.

Processing Via Control Unit

Next, the CPU loads a control program, stores a low supply surplus value that has been stored in the storage unit beforehand at a predetermined address of the main memory, compares the size of such value with that of the supply surplus indicator, and stores in the processing result at the predetermined address of the main memory. In case that the supply surplus indicator exceeds the low supply surplus value (meaning that the supply surplus is sufficient) based on the measurement result described above, the expected electrical power consumption quantity that has been already stored and the target demand value are compared, and the result thereof is stored at the predetermined address of the main memory. In case that the result shows that the expected electrical power consumption quantity is larger than the target demand value, restriction control for some or all electric power consumption of a plurality of electric devices takes place. In case that the measurement result described above shows that the supply surplus indicator falls below the low supply surplus value (meaning the supply surplus is deficient), restriction control for electrical power consumption quantities of electric devices in a uniform manner and at a certain changeable rate takes place.

Processing Flow of First Embodiment

Figure 4:
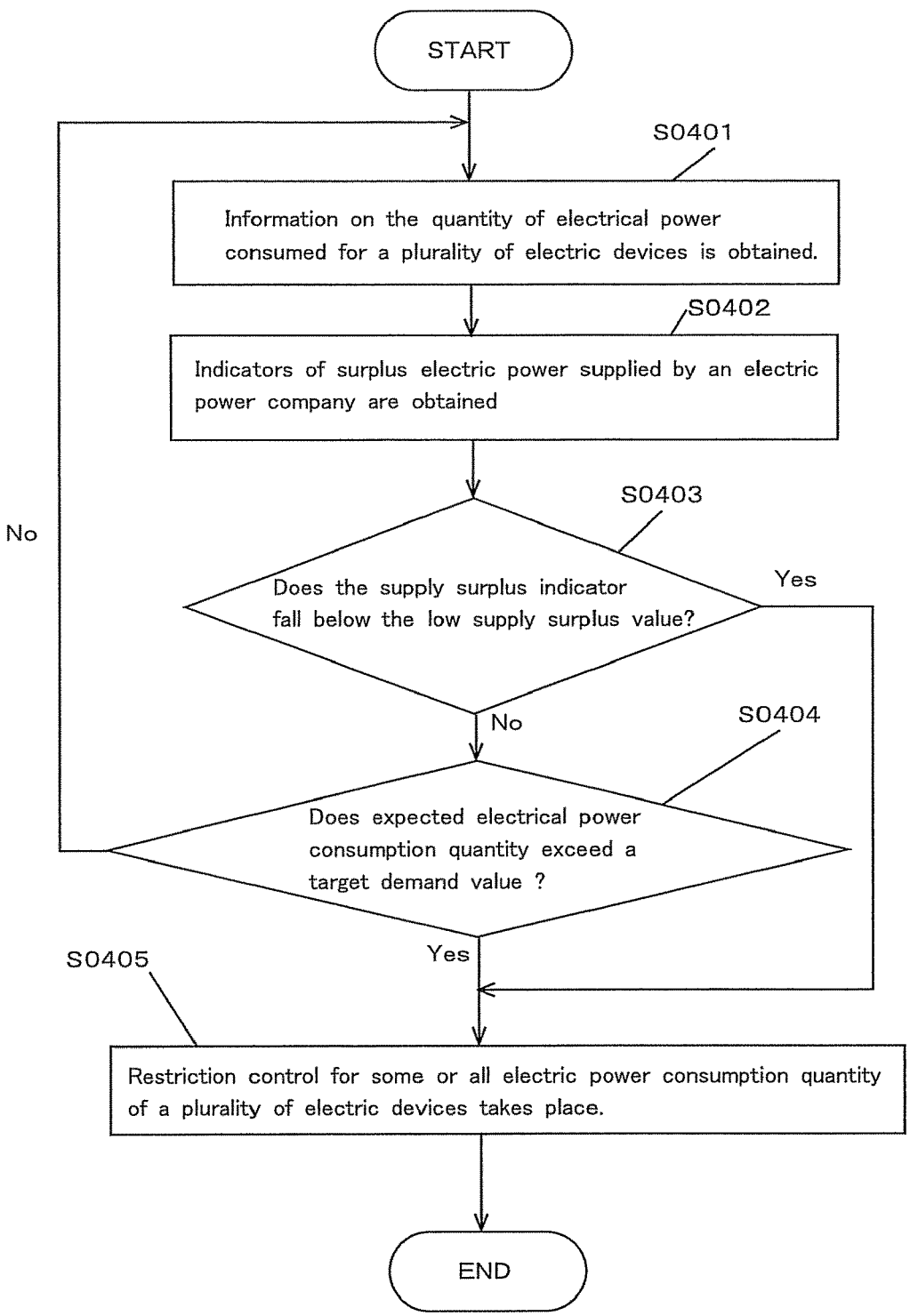
FIG. 4 is a diagram showing an example of progression of the process for controlling of the energy saving system of the first embodiment.

FIG. 4 is a diagram showing an example of progression of the process for controlling of the energy saving system of the first embodiment. The processing flow of FIG. 4 comprises the following steps. Initially, information on the quantity of electrical power consumed for a plurality of electric devices is obtained (S0401). Indicators of surplus electric power supplied by an electric power company are obtained (S0402). Next, it is determined whether or not the supply surplus indicator falls below the low supply surplus value (S0403). In case that it has been determined that the supply surplus indicator does not fall below the low supply surplus value, the processing moves on to the step 0404. In case that it has been determined that the supply surplus indicator falls below the low supply surplus value, the processing moves on to the step 0405. It is determined whether or not the expected electrical power consumption quantity exceeds the target demand value (S0404). In case that it has been determined that the expected electrical power consumption quantity does not exceed the target demand value, the processing returns to the step 0401. In case that it has been determined that the expected electrical power consumption quantity exceeds the target demand value, the processing moves on to the step 0405. Restriction control for some or all electric power consumption quantity of a plurality of electric devices takes place (S0405).

Brief Description of Effects of First Embodiment

According to the energy saving system of the first embodiment, users of an electric device controlled by the energy saving system of the first embodiment can attain a sense of energy saving. Such control will influence electric power consumption actions of general users. Therefore, consciousness of the need to undertake energy saving actions in order to prevent situations such as large-scale blackouts in regional units before they take place tends to be improved. As a result, such improvement will possibly contribute to electric power saving throughout all regions controlled by an electric power company.

Second Embodiment

Concept of Second Embodiment

The energy saving system of a second embodiment is basically the same as that of the first embodiment. The energy saving system of the second embodiment is characterized in that the lower the value of the supply surplus indicators, the greater the restriction of some or all of the electrical power consumed by the plurality of electric devices.

Configuration of Second Embodiment

Figure 5:
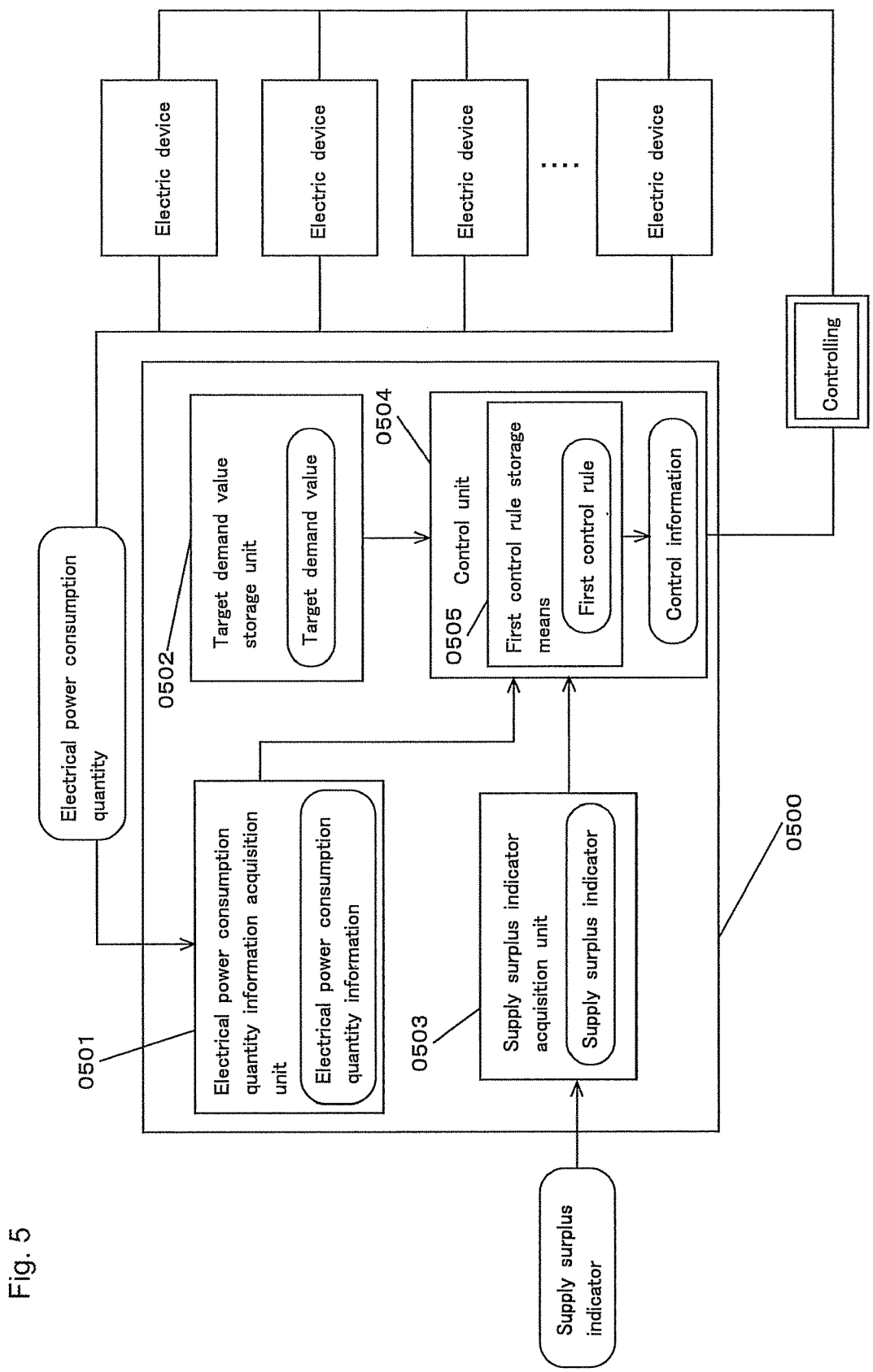
FIG. 5 is a diagram showing an example of functional block diagram of the energy saving system of a second embodiment.

FIG. 5 is a diagram showing an example of functional block diagram of the energy saving system of a second embodiment. As illustrated in FIG. 5, an "energy saving system" (0500) comprises an "electrical power consumption quantity information acquisition unit" (0501), a "target demand value storage unit" (0502), a "supply surplus indicator acquisition unit" (0503), and a "control unit" (0504). The control unit comprises a "first control rule storage means" (0505) for storing a "first control rule." Explanations of the first control rule storage means, which are not included among the explanations of the saving energy system of FIG. 1 of the first embodiment, are explained hereinafter.

The "first control rule storage means" retains the first control rule. The term "first control rule" refers to a control rule under the condition that the lower the value of the supply surplus indicators, the greater the restriction of some or all of the electrical power consumed by the plurality of electric devices. The expression "the lower the value of the supply surplus indicators" specifically refers to a situation in which a regional electricity supply-demand balance is unstable and supply by a corresponding electric power company is impeded. In case that the aforementioned situation continues for a long time, if there is even a slight increase in electrical power consumption quantity, the power supply system will be immediately hindered, and the risk of simultaneous regional blackout will increase. However, adoption of the configuration of the second embodiment allows energy saving actions to be undertaken in response to a situation in which the aforementioned regional power supply is impeded. As a result, it is possible to contribute to the stability of the power supply throughout a region.

In addition, the expression "the lower the value of the supply surplus indicators, the greater the restriction of some or all of the electrical power consumed by the plurality of electric devices" specifically refers to a situation in which, when supply surplus indicator values are lower than low supply surplus values, gradual restriction control for electrical power consumption will take place to a greater extent. FIG. 6 is a diagram showing an example of restriction control undertaken via the energy saving system of the second embodiment. In connection with the aforementioned, "x" represents a supply surplus indicator, "s" represents a low supply surplus value, and "A" represents a percentage value for the electric power quantity subject to restriction control (i.e., restriction control percentage value). As depicted in FIG. 6, according to the energy saving system of the second embodiment, the greater the difference value resulting when a supply surplus indicator "x" is deducted from a low supply surplus value "s," (i.e., the more impeded the power supply situation is), the greater the control of the relevant electric power quantities. Some or all of the electrical power consumed by the plurality of electric devices is uniformly controlled at a particular restriction rate. Subsequently, when a supply surplus indicator "x" exceeds a low supply surplus value "s," (i.e., when the power supply situation become relatively stable), controlling stops.

The electric power quantities for which restriction control takes place are subject to a method based on a specific restriction percentage value (10%, 15%, 20%, or the like) as depicted in FIG. 6. In addition to such method, it is acceptable to establish electric power quantities for which restriction control takes place via a method that more accurately reflects the actual power supply situation. A restriction percentage value can be obtained as follows. For example, the value resulting when a supply surplus indicator "x" is deducted from a low supply surplus value "s" is multiplied by a certain coefficient, and the resultant is the restriction percentage value. As described above, a restriction percentage value can be changed as needed. Such value is established in order to sufficiently preserve supply surplus of an electric power company. Therefore, such value would be sufficient to the extent that it allows supply surplus for an electric power company to be sufficiently preserved. The maximum value can be set at about 50%. (The same applies to other embodiments in which controlling takes place using a supply surplus indicator.)

Specific Configuration of Energy Saving System

A hardware configuration of the energy saving system of the second embodiment is basically the same as that of the energy saving system of the first embodiment explained with reference to FIG. 2.

Processing Via Control Unit

The CPU loads a control program, stores a low supply surplus value that has been stored in the storage unit beforehand at a predetermined address of the main memory, compares the size of such value with that of the supply surplus indicator, and stores in the processing result at the predetermined address of the main memory. In case that the supply surplus indicator falls below the low supply surplus value based on the measurement result described above, the processing for computation of the difference between the values is executed. The result thereof is stored at the predetermined address of the main memory. The first control rule is loaded, the processing for determining the restriction quantity corresponding to the computation processing result described above is executed, and restriction control for some or all electric power consumption of a plurality of electric devices takes place.

Processing Flow of Second Embodiment

Figure 7:
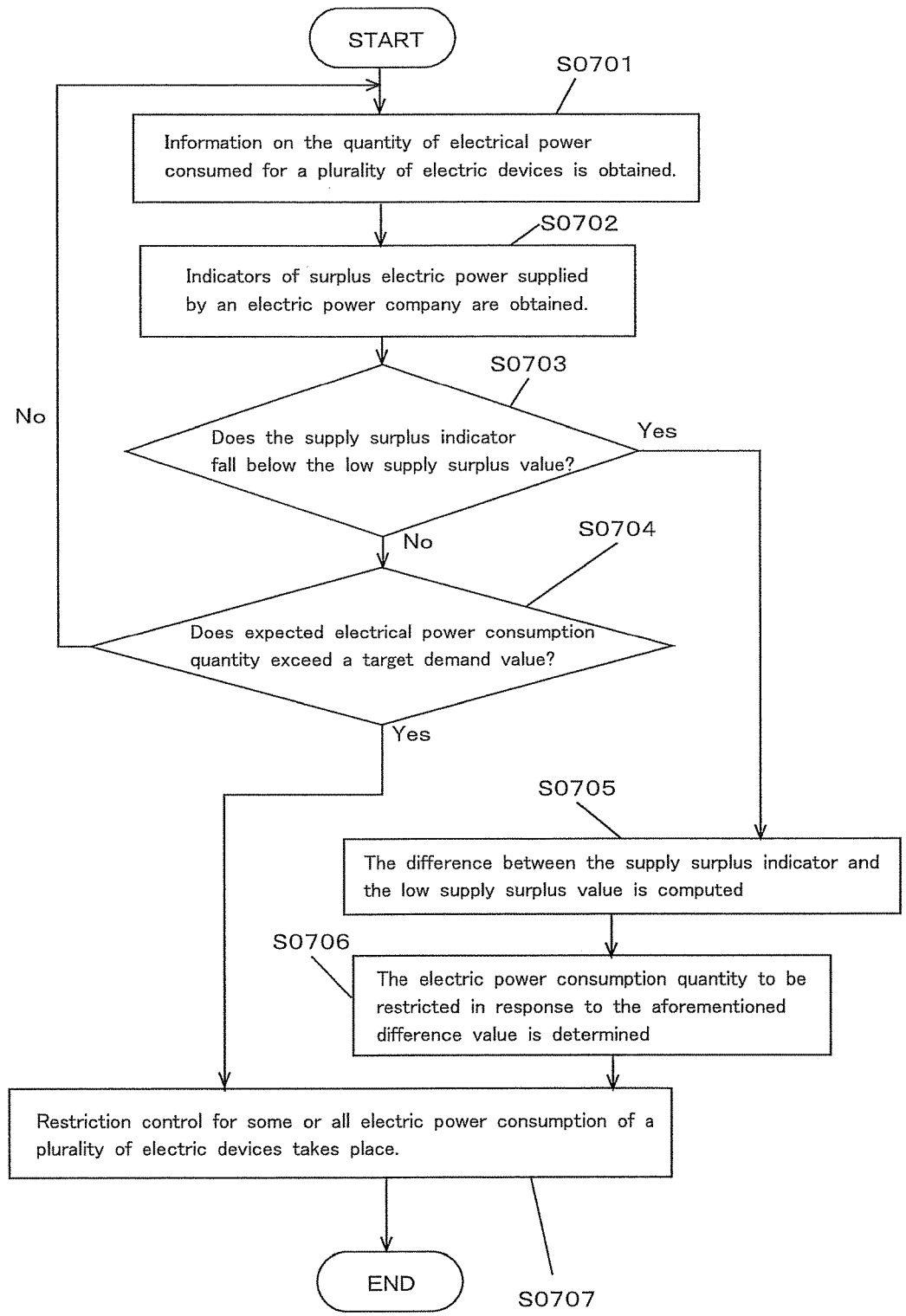
FIG. 7 is a diagram showing an example of progression of the process for controlling of the energy saving system of the second embodiment.

FIG. 7 is a diagram showing an example of progression of the process for controlling of the energy saving system of the second embodiment. The processing flow of FIG. 7 comprises the following steps. Initially, information on the quantity of electrical power consumed for a plurality of electric devices is obtained (S0701). Indicators of surplus electric power supplied by an electric power company are obtained (S0702). Next, it is determined whether or not the supply surplus indicator falls below the low supply surplus value (S0703). In case that it has been determined that the supply surplus indicator does not fall below the low supply surplus value, the processing moves on to the step 0704. In case that it has been determined that the supply surplus indicator falls below the low supply surplus value, the processing moves on to the step 0705. It is determined whether or not the expected electrical power consumption quantity exceeds the target demand value (S0704). In case that it has been determined that the expected electrical power consumption quantity does not exceed the target demand value, the processing returns to the step 0701. In case that it has been determined that the expected electrical power consumption quantity exceeds the target demand value, the processing moves on to the step 0707. The difference between the supply surplus indicator and the low supply surplus value is computed (S0705). The electric power consumption quantity to be restricted in response to the aforementioned difference value is determined (S0706). Restriction control for some or all electric power consumption of a plurality of electric devices takes place (S0707).

Brief Description of Effects of Second Embodiment

According to the energy saving system of the second embodiment, energy saving actions will be undertaken based on the electric power quantity that can be provided by an electric power company, and such actions can be changed at any time depending upon various factors, such as users' unique electric power consumption conditions as well as weather conditions and operational situations of power plants. Therefore, it is possible to undertake energy saving actions more appropriately in line with the actual conditions of usage compared with the effects of the first embodiment, thereby contributing to preservation of a stable regional electric power supply environment.

Third Embodiment

Concept of Third Embodiment

The energy saving system of a third embodiment is basically the same as that explained in the first embodiment. In the case of controlling of a plurality of electric devices, it is possible that the closer the expected electrical power consumption quantity is to 100% of the stored target demand value, the greater the restriction of some or all of the electrical power consumed by the plurality of electric devices when controlling is performed so as to restrict some or all of the electrical power consumed by the plurality of electric devices. Adoption of such configuration allows control of electric devices based on the degree of achievement of users' goals for energy saving, even in cases in which the power supply is impeded. Thus, it is possible to encourage users to undertake energy saving actions so that they can achieve their own energy saving goals on a regular basis so as not to experience the impact of the aforementioned control to the utmost extent possible.

Configuration of Third Embodiment

Figure 8:
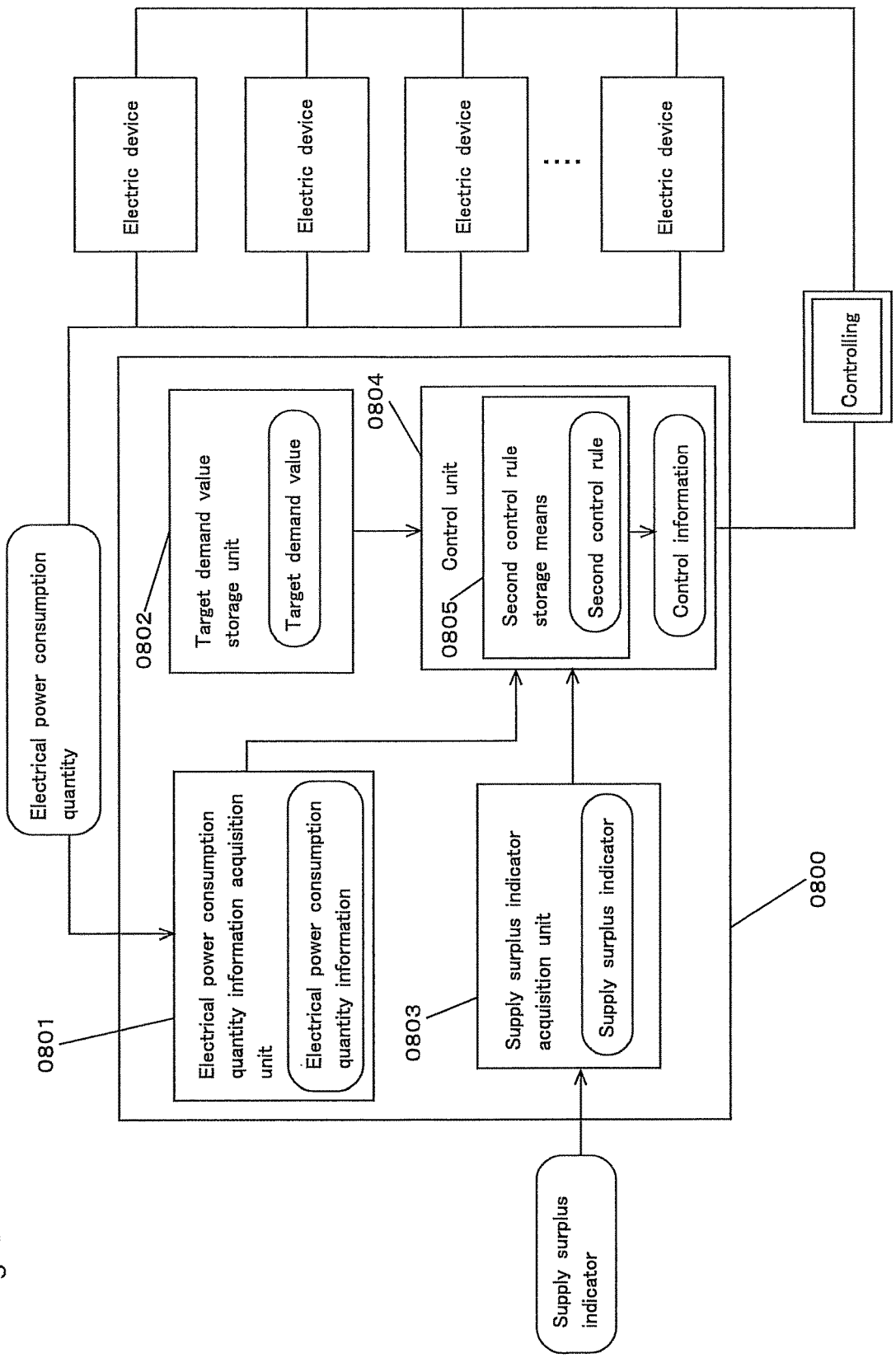
FIG. 8 is a diagram showing an example of functional block diagram of the energy saving system of a third embodiment.

FIG. 8 is a diagram showing an example of functional block diagram of the energy saving system of a third embodiment. As illustrated in FIG. 8, an "energy saving system" (0800) comprises an "electrical power consumption quantity information acquisition unit" (0801), a "target demand value storage unit" (0802), a "supply surplus indicator acquisition unit" (0803), and a "control unit" (0804). The control unit comprises a "second control rule storage means" (0805) for storing a "second control rule." Explanations of the second control rule storage means, which are not included among the explanations of the saving energy system of FIG. 1 of the first embodiment, are explained hereinafter.

The "second control rule storage means" retains the second control rule. The term "second control rule" refers to a control rule under the condition that the closer the expected electrical power consumption quantity is to 100% of the stored target demand value, the greater the restriction of some or all of the electrical power consumed by the plurality of electric devices. The term "the percentage of the stored target demand value accounted for by the expected electrical power consumption quantity" specifically refers to the percentage value representing how much electric power quantity is expected to be consumed in relation to the target demand value. Such value is so called a target achievement rate. The smaller such value, the lower the electrical power consumption quantity in relation to the target demand value. In such a case, energy saving is being performed on a daily basis. The larger such value, the greater the energy saving actions that are necessary.

FIG. 9 is a diagram showing an example of restriction control undertaken via the energy saving system of the third embodiment. In connection with the aforementioned, "x" represents a supply surplus indicator, "s" represents a low supply surplus value, "z" represents an electrical power consumption quantity, "y" represents a target demand value, "z (1+k)" represents the electrical power consumption quantity expected during a period for which a target demand value is established, and "A" represents a percentage value for the electric power quantity subject to restriction control. As described above, when using electric devices for which target achievement rates are high, there are many controllable electrical power consumption quantities. Moreover, there is a great need to encourage users who consume large amounts of electric power to undertake daily energy saving actions. The energy saving system of the third embodiment allows such users to enhance their awareness of energy saving so that they can deliberately undertake energy saving actions on a daily basis.

In addition, the energy saving system of the third embodiment can be configured so that energy saving control can be undertaken in combination with two control rules, which are the first control rule characterized in the energy saving system of the second embodiment and the second control rule. In the case of such configuration, the control unit first computes the expected electrical power consumption quantity as a percentage of the target demand value in accordance with the second control rule, determines the specific scope of electric power quantity to be restricted, and subsequently executes restriction control for electric power consumption of electric devices based on the first control rule.

FIG. 10 is a diagram showing another example of restriction control undertaken via the energy saving system of the third embodiment. Therein, "x" represents a supply surplus indicator, "s" represents a low supply surplus value, "y" represents the target demand value, "z (1+k)" represents the electrical power consumption quantity that can be expected for the period for which the target demand value has been established, and "A" represents a percentage value for the electric power quantity subject to restriction control. As depicted in FIG. 10, as long as the supply surplus indicator exceeds the low supply surplus value, the energy saving system of the third embodiment undertakes controlling depending upon whether or not the electrical power consumption quantity exceeds the target demand value as depicted in FIG. 2. On the other hand, in case that the supply surplus indicator is less than or equal to the low supply surplus value, based on the proximity of the electrical power consumption quantity to the target demand value, the range of electric power percentage is determined. (In FIG. 10, for example, the ranges are 10% through 14%, 14% through 18%, and 18% through 20%.) Furthermore, based on the extent of the value resulting when the supply surplus indicator is deducted from the low supply surplus value, restriction control for the electrical power consumption quantity takes place within the scope of the aforementioned range of electric power percentage to be restricted. The greater the percentage of the expected electric power consumption quantity in relation to the target demand value is, the greater the extent of the electric power quantity to be reduced. A configuration that focuses on such point allows segmentalization of the patterns for restriction control and flexible restriction control for users undertaking various electric power consumption actions.

Specific Configuration of Energy Saving System

A hardware configuration of the energy saving system of the third embodiment is basically the same as that of the energy saving system of the first embodiment or the second embodiment explained with reference to FIG. 3. However, the energy saving system of the third embodiment is possible under the condition that the closer the expected electrical power consumption quantity is to 100% of the stored target demand value, the greater the restriction of some or all of the electrical power consumed by the plurality of electric devices.

Specific Processing Via Control Unit

The CPU loads a control program, stores a low supply surplus value that has been stored in the storage unit beforehand at a predetermined address of the main memory, compares the size of such value with that of the supply surplus indicator, and stores in the processing result at the predetermined address of the main memory. In case that the measurement result described above indicates that the supply surplus indicator falls below the low supply surplus value, the expected electrical power consumption quantity as a percentage of the target demand value is computed. The processing result is stored at the predetermined address of the main memory. The second control rule is loaded, the processing for determining the restriction quantity corresponding to the computation processing result described above is executed, and restriction control for some or all electric power consumption of a plurality of electric devices takes place.

The specific processing for the control unit in case that the energy saving system of the third embodiment also retains the first control rule storage means is described as follows. In such case, the CPU loads a control program, stores a low supply surplus value that has been stored in the storage unit beforehand at a predetermined address of the main memory, compares the size of such value with that of the supply surplus indicator, and stores in the processing result at the predetermined address of the main memory. In case that the supply surplus indicator falls below the low supply surplus value based on the measurement result described above, the processing for computation of the expected electrical power consumption quantity as a percentage of the target demand value is computed. The result thereof is stored at the predetermined address of the main memory. The second control rule is loaded, the processing for determining the restriction quantity corresponding to the computation processing result described above is executed, and the result thereof is stored at the predetermined address of the main memory. Subsequently, the processing for computation of the difference between the supply surplus indicator and the low supply surplus value is executed, and the result thereof is stored at the predetermined address of the main memory. The first control rule is loaded, the processing for determining the restriction quantity corresponding to the computation processing result described above within the scope of restriction quantity determined as above is executed, and restriction control for some or all electric power consumption of a plurality of electric devices takes place.

Processing Flow of Third Embodiment

Figure 11:
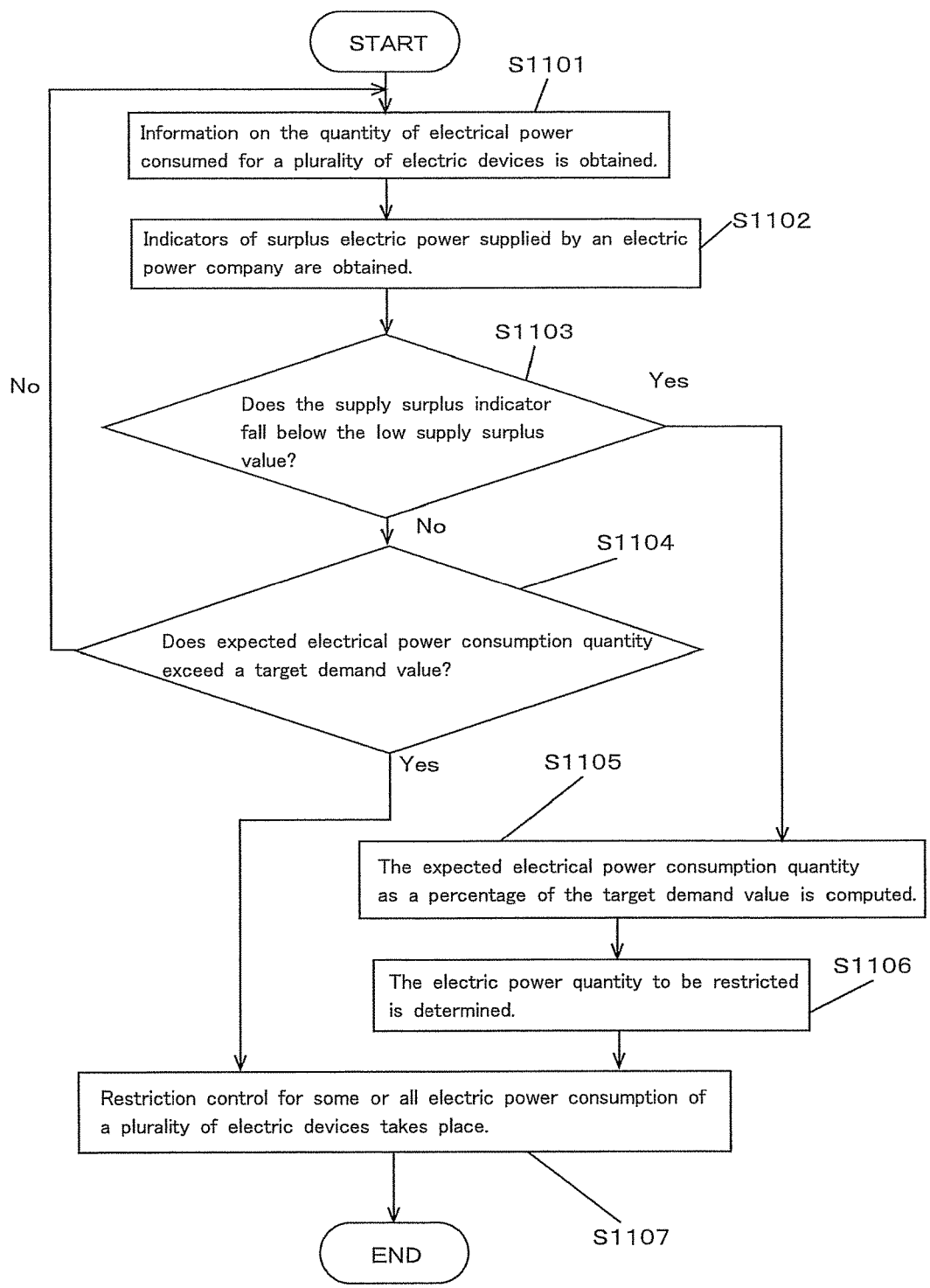
FIG. 11 is a diagram showing an example of progression of the process for controlling of the energy saving system of the third embodiment.

FIG. 11 is a diagram showing an example of progression of the process for controlling of the energy saving system of the third embodiment. The processing flow of FIG. 11 comprises the following steps. Initially, information on the quantity of electrical power consumed for a plurality of electric devices is obtained (S1101). Indicators of surplus electric power supplied by an electric power company are obtained (S1102). Next, it is determined whether or not the supply surplus indicator falls below the low supply surplus value (S1103). In case that it has been determined that the supply surplus indicator does not fall below the low supply surplus value, the processing moves on to the step 1104. In case that it has been determined that the supply surplus indicator falls below the low supply surplus value, the processing moves on to the step 1105. It is determined whether or not the expected electrical power consumption quantity exceeds the target demand value (S1104). In case that it has been determined that the expected electrical power consumption quantity does not exceed the target demand value, the processing returns to the step 1101. In case that it has been determined that the expected electrical power consumption quantity exceeds the target demand value, the processing moves on to the step 1107. The expected electrical power consumption quantity as a percentage of the target demand value is computed (S1105).

The electric power consumption to be restricted in relation to the aforementioned percentage is determined (S1106). Restriction control for some or all electric power consumption of a plurality of electric devices takes place (S1107).

Figure 12:
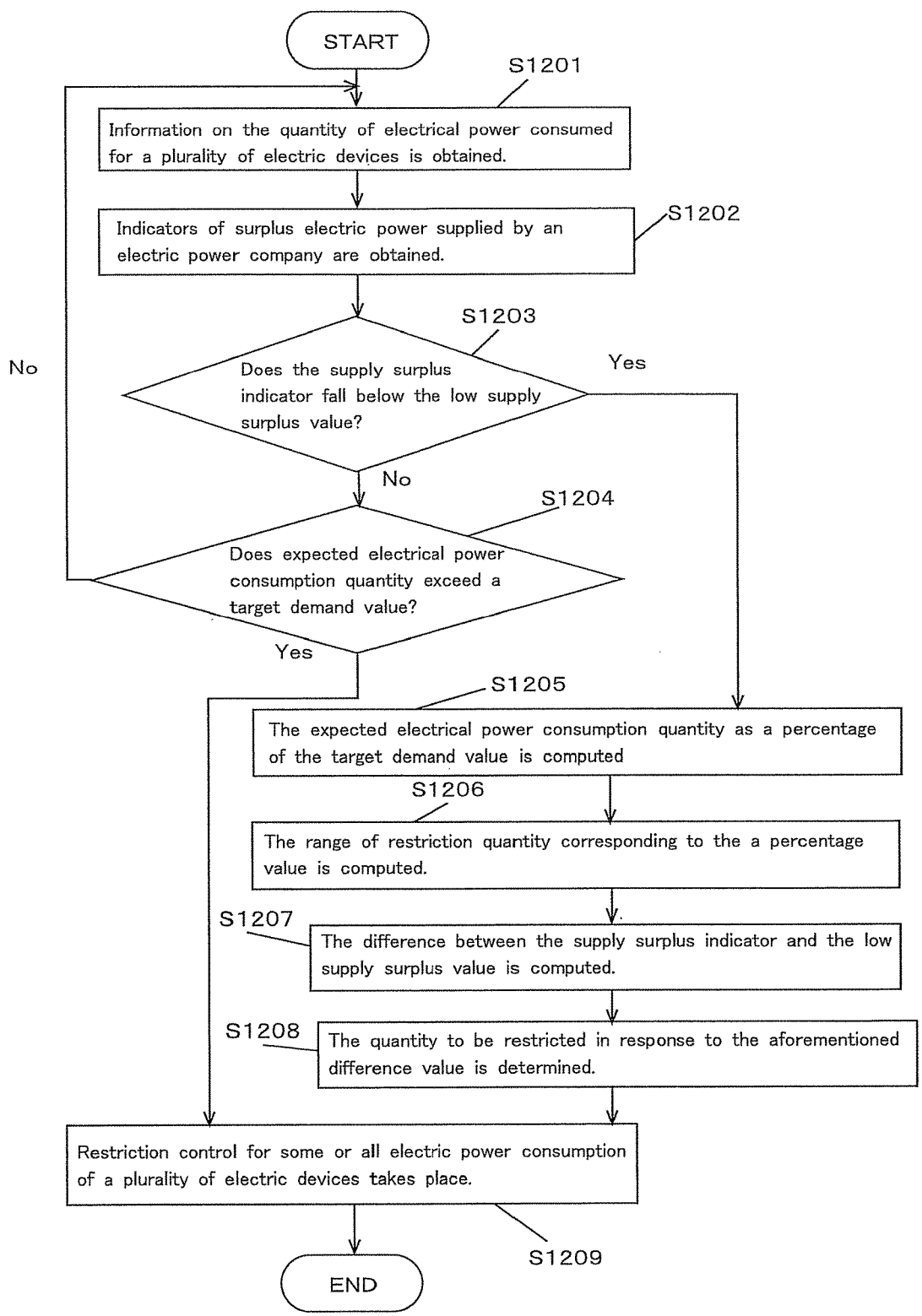
FIG. 12 is a diagram showing an example of progression of the process for controlling of the energy saving system of the third embodiment.

FIG. 12 is a diagram showing an example of progression of the process for controlling of the energy saving system of the third embodiment. The processing flow of FIG. 12 comprises the following steps. Initially, information on the quantity of electrical power consumed for a plurality of electric devices is obtained (S1201). Next, indicators of surplus electric power supplied by an electric power company are obtained (S1202). Subsequently, it is determined whether or not the supply surplus indicator falls below the low supply surplus value (S1203). In case that it has been determined that the supply surplus indicator does not fall below the low supply surplus value, the processing moves on to the step 1204. In case that it has been determined that the supply surplus indicator falls below the low supply surplus value, the processing moves on to the step 1205. It is determined whether or not the expected electrical power consumption quantity exceeds the target demand value (S1204). In case that it has been determined that the expected electrical power consumption quantity does not exceed the target demand value, the processing returns to the step 1201. In case that it has been determined that the expected electrical power consumption quantity exceeds the target demand value, the processing moves on to the step 1209. The expected electrical power consumption quantity as a percentage of the target demand value is computed (S1205). The range of restriction quantity corresponding to the a percentage value mentioned above is computed (S1206). The difference between the supply surplus indicator and the low supply surplus value is computed (S1207). The electric power consumption quantity to be restricted in response to the aforementioned difference value is determined (S1208). Restriction control for some or all electric power consumption of a plurality of electric devices takes place (S1209).

Brief Description of Effects of Third Embodiment

In addition to the effect of the first embodiment, the energy saving system of the third embodiment makes it possible to connect the controlling pattern used in an emergency in which electric power supply situation is impeded with the extent of target achievement for daily energy saving of users. Thus, the energy saving system of the third embodiment allows users to enhance their energy saving awareness, keeping in mind such connection on a daily basis as well as in the event of emergency.

4 Fourth Embodiment

Concept of Fourth Embodiment

The energy saving system of a fourth embodiment is basically the same as that of the first embodiment. The target demand value has been set based on categorization of the plurality of electric devices into a plurality of groups, and control of the electrical power to be consumed can be implemented via the control unit on a group basis. Adoption of such configuration and establishment of different demand values classified by group allows energy saving actions to be undertaken while flexible controlling is implemented in line with actual usage conditions. For example, controlling may be implemented classified by location or type of electric device.

Configuration of Fourth Embodiment

Figure 13:
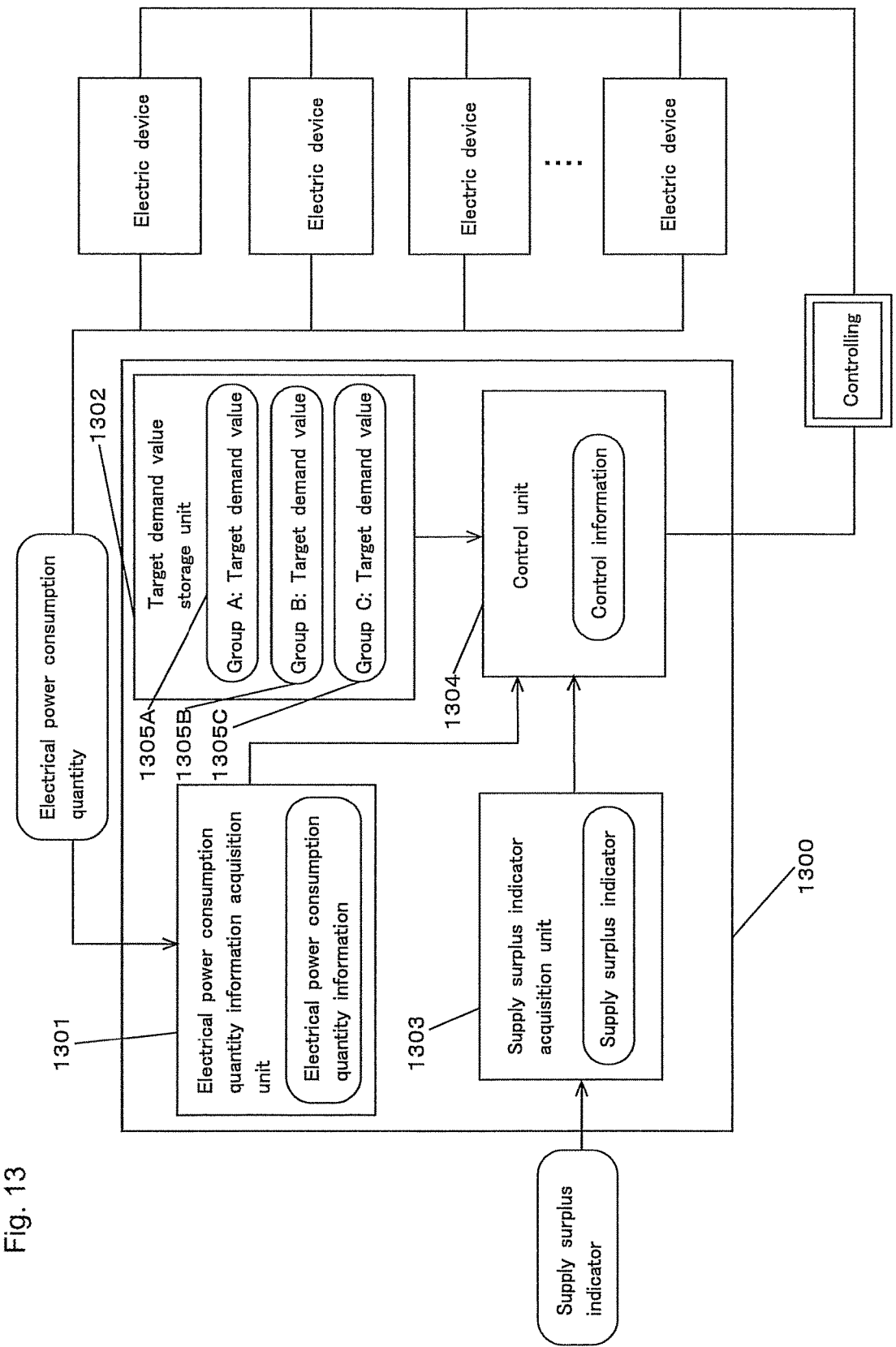
FIG. 13 is a diagram showing an example of functional block diagram of the energy saving system of a fourth embodiment.

FIG. 13 is a diagram showing an example of functional block diagram of the energy saving system of a fourth embodiment. As illustrated in FIG. 13, an "energy saving system" (1300) comprises an "electrical power consumption quantity information acquisition unit" (1301), a "target demand value storage unit" (1302), a "supply surplus indicator acquisition unit" (1303), and a "control unit" (1304). The "target demand value storage unit" comprises a "means for storing a target demand value classified by group" (1305). Explanations of the means for storing a target demand value classified by group, which are not included among the explanations of the saving energy system of FIG. 1 of the first embodiment, are explained hereinafter.

The "means for storing a target demand value classified by group" retains the function for setting the target demand value based on categorization of the plurality of electric devices into a plurality of groups, and storing such value on a group basis. The expression "based on categorization of the plurality of electric devices into a plurality of groups" refers to a situation in which individual identification IDs that store a plurality of pieces of information based on the hierarchical structure are assigned to electric devices and one or more identification IDs with which relevant information is matched within a specific hierarchy are collectively categorized as a single group.

FIG. 14 is a diagram showing an example of database for groups stored in the energy saving system of the fourth embodiment. Specific examples of the hierarchical structure elements mentioned above can be a "name (type)," "installment floor," "installment space," and/or "setting mode" for an electric device as a configuration unit. Individual pieces of information classified by electric device have been recorded in each hierarchy. Therefore, it is acceptable to perform grouping classified by location in which electric devices are located. Specific examples for grouping are "conference room," "reception room," "the entire $2^{nd}$ floor," or the like. Alternatively, it is acceptable to perform grouping classified by type of electric device, such as "lightning system," "personal computer," "air conditioner," or the like. Furthermore, it is acceptable to perform grouping using a plurality of hierarchies, such as "$2^{nd}$ floor, air conditioner," or the like. Furthermore, in regard to the energy saving system that comprehensively controls a plurality of homes, offices, facilities, or the like (hereinafter referred to as "Facilities, etc."), grouping of such Facilities, etc. is performed in a singular or plural manner. It is also possible to establish further subgroups classified by location within such Facilities, etc. Adoption of such configuration allows users to establish a target demand value flexibly in line with the purpose of use for, characteristics of, and actual conditions of usage of individual electric devices for human activities and to perform restriction control. Moreover, it is possible to set the electric power so that it is restricted in line with the aforementioned actual conditions for usage. In the case of the example shown in FIG. 14, considering the purposes for which it is used, a "refrigerator" is not necessarily a desirable electric device for which restriction control is performed. It is possible to think that the target demand value to which such electric device corresponds should be higher. A group to which electric devices with less hindrance for off control belong is created. Thereby, it is also possible to set a restriction percentage value for such group at 100% (meaning that the power source is completely off). As described above, establishment of individual and specific target demand values and determination of electric power to be restricted in line with actual conditions for usage allow users to undertake energy saving actions reasonably without causing remarkable hindrance to actual human activities.

Specific Configuration of Energy Saving System

A hardware configuration of the energy saving system of the fourth embodiment is basically the same as that of the energy saving system of the first embodiment explained with reference to FIG. 3.

Processing Via Electrical Power Consumption Quantity Information Acquisition Unit The CPU loads a program for acquiring information on electrical power consumption quantity, acquires information on electrical power consumption quantities of a plurality of electric devices from the electric measuring instrument via the interface, and stores such information based on a group corresponding to identification IDs given to electric devices at a predetermined address of the main memory.

Specific Processing Via Control Unit

The CPU loads a control program, stores a low supply surplus value that has been stored in the storage unit beforehand at a predetermined address of the main memory, compares the size of such value with that of the supply surplus indicator, and stores in the processing result at the predetermined address of the main memory. In case that the supply surplus indicator falls below the low supply surplus value based on the processing result described above, the target demand value stored in the storage unit on a group basis is stored at the predetermined address of the main memory, the processing for comparison of such value with the information on expected electrical power consumption quantities classified by corresponding group (which is already stored) is executed, and the processing result is stored at the predetermined address of the main memory. In case that such processing result indicates that the expected electrical power consumption quantity is larger, restriction control for some or all electric power consumption of a plurality of electric devices on a corresponding group basis takes place.

Processing Flow of Fourth Embodiment

Figure 15:
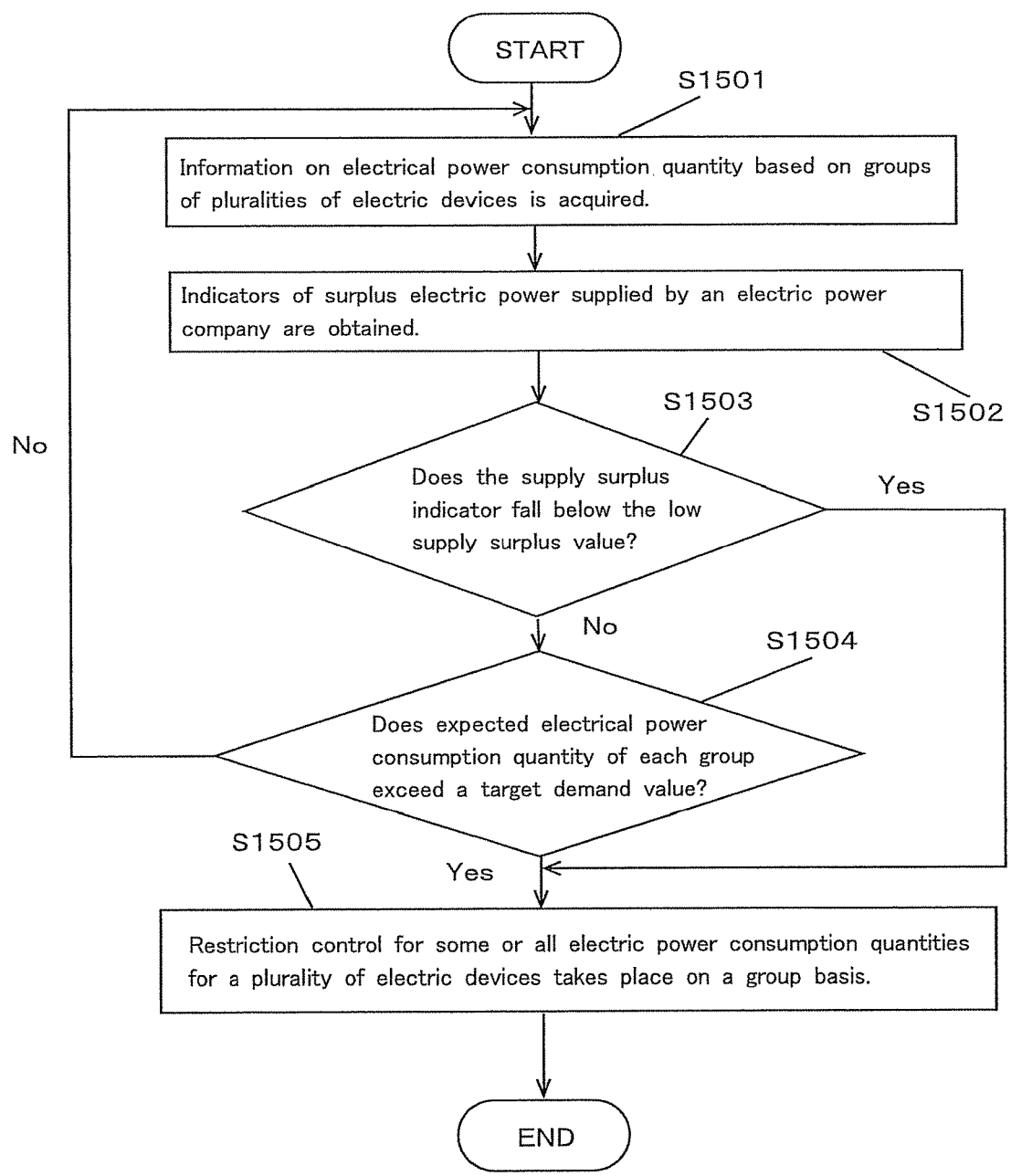
FIG. 15 is a diagram showing an example of progression of the process for controlling of the energy saving system of the fourth embodiment.

FIG. 15 is a diagram showing an example of progression of the process for controlling of the energy saving system of the fourth embodiment. The processing flow of FIG. 15 comprises the following steps. Initially, information on electrical power consumption quantity based on groups of pluralities of electric devices is acquired (S1501). Indicators of surplus electric power supplied by an electric power company are obtained (S1502). Next, it is determined whether or not the supply surplus indicator falls below the low supply surplus value (S1503). In case that it has been determined that the supply surplus indicator does not fall below the low supply surplus value, the processing moves on to the step 1504. In case that it has been determined that the supply surplus indicator falls below the low supply surplus value, the processing moves on to the step 1505. It is determined whether or not the expected electrical power consumption quantity exceeds the target demand value (S1504). In case that it has been determined that the expected electrical power consumption quantity does not exceed the target demand value, the processing returns to the step 1501. In case that it has been determined that the expected electrical power consumption quantity exceeds the target demand value, the processing moves on to the step 1505. Restriction control for some or all electric power consumption quantities for a plurality of electric devices takes place on a group basis (S1505).

Brief Description of Effects of Fourth Embodiment

In addition to the effect of the first embodiment, the energy saving system of the fourth embodiment makes it possible for users to establish individual target demand values classified by group flexibly in line with actual conditions for usage of electric devices. Thus, users can undertake energy saving actions reasonably through actual establishment of target demand values and can further enhance their energy saving awareness.

Fifth Embodiment

Concept of Fifth Embodiment

The energy saving system of a fifth embodiment is basically the same as that of the fourth embodiment. In case that there exist a plurality of groups for which expected electrical power consumption quantities are higher than target demand values, if the electrical power consumption quantities are restricted for the plurality of the groups, it is possible to establish greater restriction quantities in accordance for the groups that consume greater amounts of electric power. Adoption of such configuration makes it possible to control electric devices that consume large quantities of electric power and have a wide range of surpluses resulting from control on a group basis. Thus, users can undertake efficient energy saving actions. For example, upon controlling, it is possible to avoid influence on usage of electric devices that belong to other groups to the utmost extent possible.

Configuration of Fifth Embodiment

Figure 16:
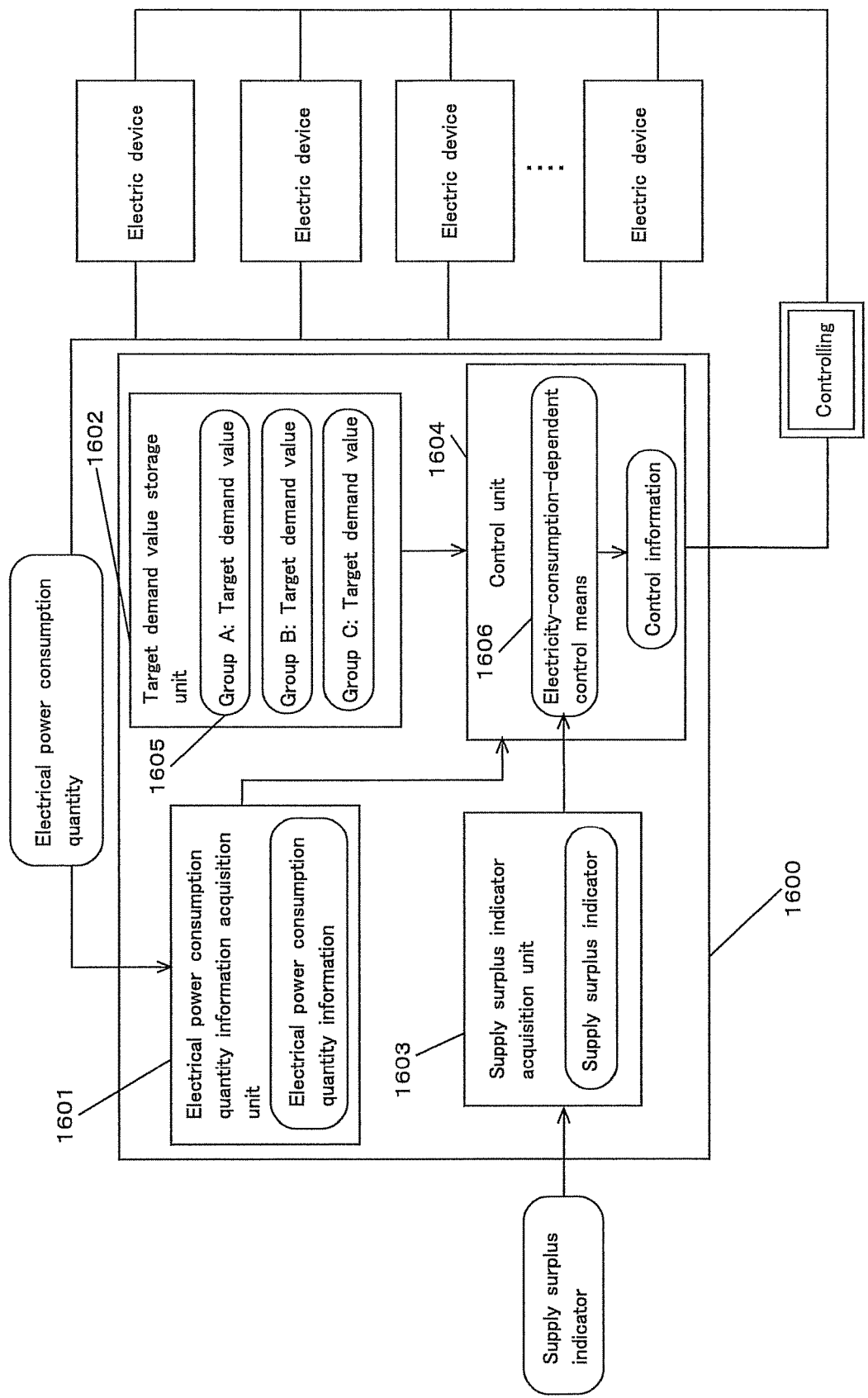
FIG. 16 is a diagram showing an example of functional block diagram of the energy saving system of the energy saving system of a fifth embodiment.

FIG. 16 is a diagram showing an example of functional block diagram of the energy saving system of the energy saving system of a fifth embodiment. As illustrated in FIG. 16, an "energy saving system" (1600) comprises an "electrical power consumption quantity information acquisition unit" (1601), a "target demand value storage unit" (1602), a "supply surplus indicator acquisition unit" (1603), and a "control unit" (1604). The "target demand value storage unit" comprises a "means for storing a target demand value classified by group" (1605). The "control unit" comprises an "electricity-consumption-dependent control means" (1606). Explanations of the electricity-consumption-dependent control means, which are not included among the explanations of the saving energy system of FIG. 13 of the fourth embodiment, are explained hereinafter.

In a plurality of groups for which the expected electrical power consumption quantities exceeds target demand values, the "electricity-consumption-dependent control means" retains the function for establishing greater restriction quantities in accordance for the groups that consume greater amounts of electric power. More specifically, restriction quantities in accordance for the order of priority of groups that consume greater amounts of electric power expected (i.e., expected electrical power consumption quantity) during a unit time based on a group that comprises one electric device or more electric devices are established to a greater extent possible. FIG. 17 is a diagram showing an example of specific restriction control undertaken via the energy saving system of the energy saving system of the fifth embodiment. "A" represents a percentage value for the electric power quantity subject to restriction control and the higher the priority order is, the greater the restriction electric power quantity is. Adoption of the aforementioned configurations allows restriction of electric power consumption in a relevant order and on a group basis as well as controlling of electric devices for which electrical power consumption quantities are great on a corresponding group basis. Thus, control that influences usage of electric devices of other groups can be restricted, allowing efficient energy saving actions.

Specific Configuration of Energy Saving System

A hardware configuration of the energy saving system of the fifth embodiment is basically the same as that of the energy saving system of the first embodiment explained with reference to FIG. 3. However, the energy saving system of the fifth embodiment treats a plurality of electric devices on a group basis. A plurality of electric devices are treated groups for which the expected electrical power consumption quantities exceeds target demand values, establishing greater restriction quantities in accordance for the groups that consume greater amounts of electric power.

Specific Processing Via Control Unit

The CPU loads a control program, stores a low supply surplus value that has been stored in the storage unit beforehand at a predetermined address of the main memory, compares the size of such value with that of the supply surplus indicator, and stores in the processing result at the predetermined address of the main memory. In case that the supply surplus indicator falls below the low supply surplus value based on the processing result described above, the target demand value stored in the storage unit on a group basis is stored at the predetermined address of the main memory, the processing for comparison of such value with the information on expected electrical power consumption quantities classified by corresponding group (which is already stored) is executed, and the processing result is stored at the predetermined address of the main memory. In case that such processing result indicates that the expected electrical power consumption quantity is larger, the processing for detection as to whether or not there exist a plurality of such groups and the processing result is stored at the predetermined address of the main memory. In case that the processing result indicates that there exist a plurality of groups, such groups are sorted out in accordance for the groups that consume greater amounts of electric power, processing for determination of restriction quantities classified by group corresponding to the aforementioned priority of order is executed, and the processing result is stored at the predetermined address of the main memory. Based on processing result, restriction control for some or all electric power consumption quantities for a plurality of electric devices takes place on a group basis.

Processing Flow of Fifth Embodiment

Figure 18:
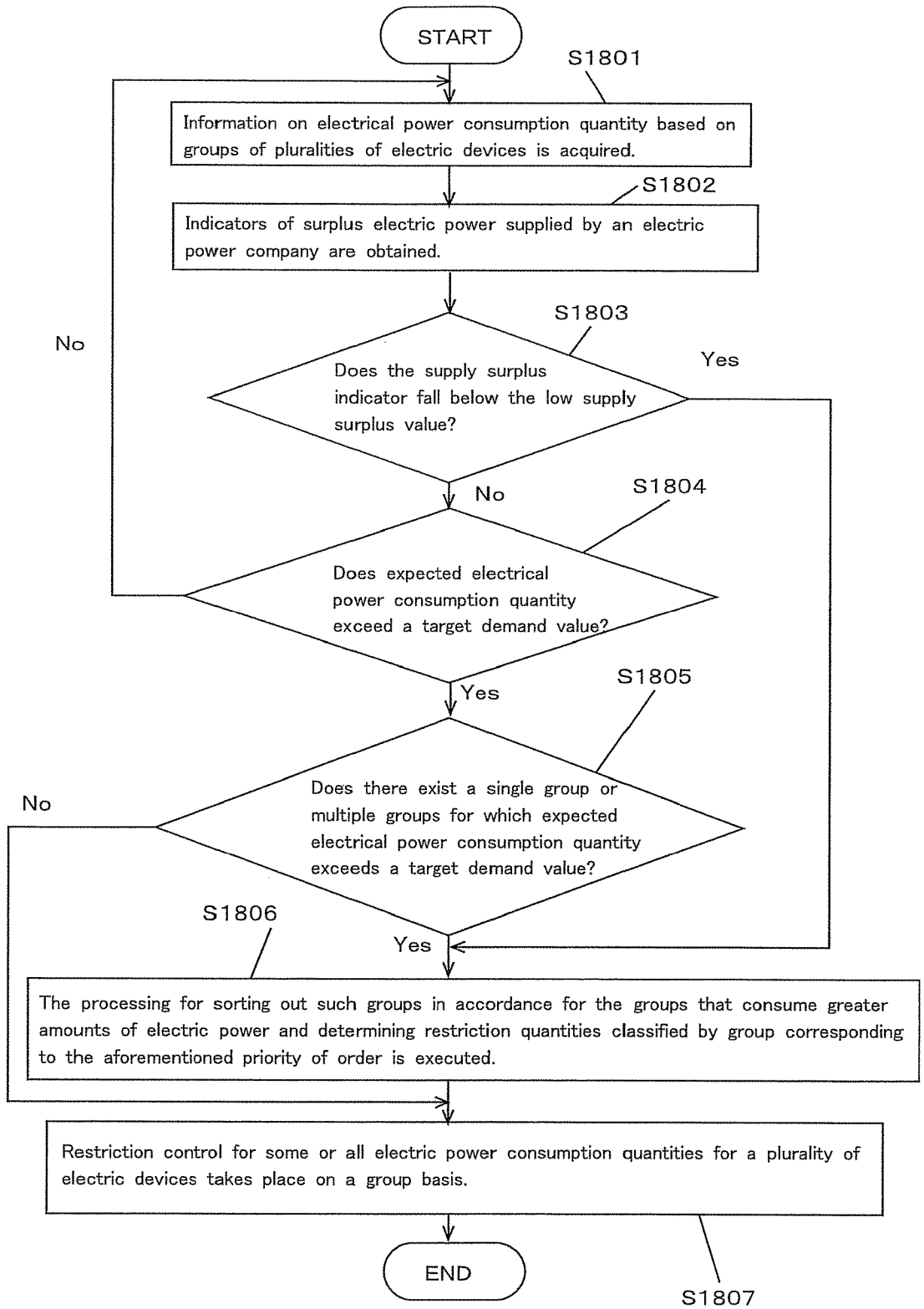
FIG. 18 is a diagram showing an example of progression of the process for controlling of the energy saving system of the fifth embodiment.

FIG. 18 is a diagram showing an example of progression of the process for controlling of the energy saving system of the fifth embodiment. Initially, information on electrical power consumption quantity based on groups of pluralities of electric devices is acquired (S1801). Indicators of surplus electric power supplied by an electric power company are obtained (S1802). Next, it is determined whether or not the supply surplus indicator falls below the low supply surplus value (S1803). In case that it has been determined that the supply surplus indicator does not fall below the low supply surplus value, the processing moves on to the step 1804. In case that it has been determined that the supply surplus indicator falls below the low supply surplus value, the processing moves on to the step 1806. It is determined whether or not expected electrical power consumption quantity of each group exceeds a target demand value (S1804). It is determined whether or not the expected electrical power consumption quantity of each group does not the target demand value, the processing returns to the step 1801. In case that it has been determined that the expected electrical power consumption quantity of each group exceeds the target demand value, the processing moves on to the step 1805. Next, processing for determination of whether there exists a single group or multiple groups for which the expected electrical power consumption quantity exceeds the target demand value is executed (S1805). In case that it is determined that there exists a single such group, the processing moves on to the step 1807. In case that it is determined that there exist multiple such groups, the processing moves on to the step 1806. The processing for sorting out such groups in accordance for the groups that consume greater amounts of electric power and determining restriction quantities classified by group corresponding to the aforementioned priority of order is executed (S1806). Next, restriction control for some or some or all electric power consumption quantities of a plurality of electric devices takes place on a group basis (S1807).

Brief Description of Effects of Fifth Embodiment

In addition to the effect of the fourth embodiment, the energy saving system of the fifth embodiment makes it possible to control electric devices in accordance for the groups that consume greater amounts of electric power by selecting the electric devices for which restriction control is performed via the energy saving system of the fifth embodiment in accordance for the groups that consume greater amounts of electric power. Thus, users can undertake efficient energy saving actions. For example, upon controlling, it is possible to avoid influence on usage of electric devices that belong to other groups to the utmost extent possible.

6 Sixth Embodiment

Concept of Sixth Embodiment

The energy saving system of a sixth embodiment is basically the same as that of the fourth embodiment. In the case of restriction of electrical power consumption quantities, it is possible to increase quantities to be restricted in accordance with the priority of order in which the expected electrical power consumption quantity as a percentage of the target demand value classified by group is closer to 100%. Adoption of such configuration allows users to achieve entrenched energy saving awareness that allows them to comply with target demand values on a daily basis.

Configuration of Sixth Embodiment

Figure 19:
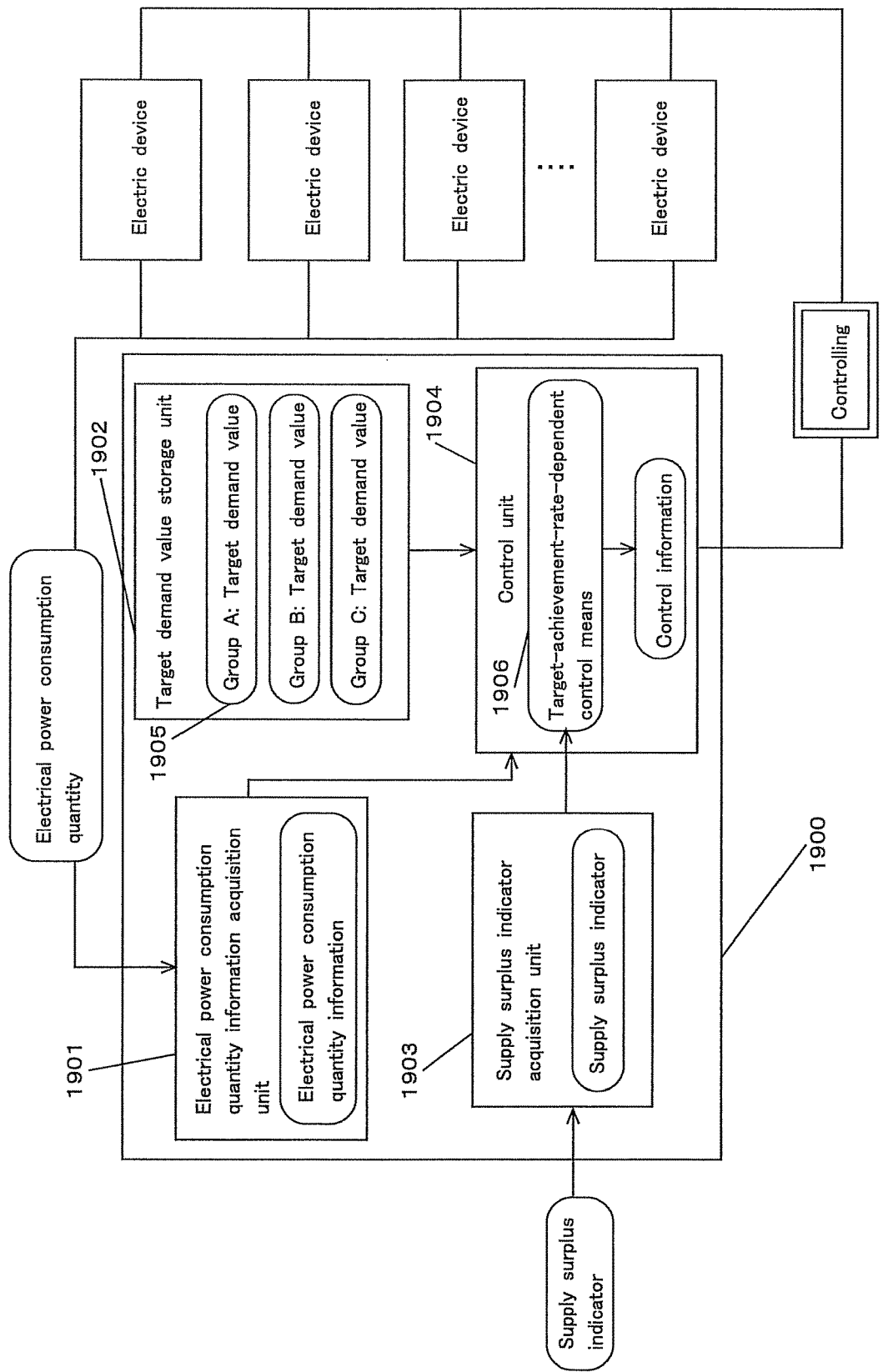
FIG. 19 is a diagram showing an example of functional block diagram of the energy saving system of a sixth embodiment.

FIG. 19 is a diagram showing an example of functional block diagram of the energy saving system of a sixth embodiment. As illustrated in FIG. 19, an "energy saving system" (1900) comprises an "electrical power consumption quantity information acquisition unit" (1901), a "target demand value storage unit" (1902), a "supply surplus indicator acquisition unit" (1903), and a "control unit" (1904). The "target demand value storage unit" comprises a "means for storing a target demand value classified by group" (1905). The "control unit" comprises an "target-achievement-rate-dependent control means" (1906). Explanations of the target-achievement-rate-dependent control means, which are not included among the explanations of the saving energy system of FIG. 13 of the fourth embodiment, are explained hereinafter.

The "target-achievement-rate-dependent control means" retains the function for restricting the electrical power consumed by the plurality of groups based on an priority of order such that the closer the expected electrical power consumption quantity of a group is to 100% of the target demand value, the greater the restriction of the electrical power consumed by such group. The expression "based on an priority of order such that the closer the expected electrical power consumption quantity of a group is to 100% of the target demand value, the greater the restriction of the electrical power consumed by such group" means that the greater such target demand value, the greater the restriction of the electric power quantity. As a specific example, it is possible for the same processing as the restriction processing shown in FIG. 9 that was used in the third embodiment to be executed. The energy saving system of the sixth embodiment preferentially encourages users who use a large quantity of electrical power as a percentage of the target demand value (that is, users whose target achievement rate is low) to undertake energy saving actions. When using electric devices under the aforementioned circumstances, there are many controllable electrical power consumption quantities. Moreover, there is a great need to encourage users who consume large amounts of electric power to undertake daily energy saving actions. The energy saving system of the sixth embodiment allows such users to enhance their awareness of energy saving so that they can deliberately undertake energy saving actions on a daily basis.

Specific Configuration of Energy Saving System

A hardware configuration of the energy saving system of the sixth embodiment is basically the same as that of the energy saving system of the first embodiment explained with reference to FIG. 3. However, the energy saving system of the sixth embodiment makes it possible to increase the restriction quantities in accordance with the priority order of the groups whose target achievement rate is low among a plurality of electric devices.

Specific Processing Via Control Unit

The CPU loads a control program, stores a low supply surplus value that has been stored in the storage unit beforehand at a predetermined address of the main memory, compares the size of such value with that of the supply surplus indicator, and stores in the processing result at the predetermined address of the main memory. In case that the supply surplus indicator falls below the low supply surplus value based on the processing result described above, the target demand value stored in the storage unit on a group basis is stored at the predetermined address of the main memory, the processing for comparison of such value with the information on expected electrical power consumption quantities classified by corresponding group (which is already stored) is executed, and the processing result is stored at the predetermined address of the main memory. In case that such processing result indicates that the expected electrical power consumption quantity is larger, the processing for detection as to whether or not there exist a plurality of such groups and the processing result is stored at the predetermined address of the main memory. In case that the processing result indicates that there exist a plurality of groups, such groups are sorted out in accordance for the groups that the expected electrical power consumption quantity as a percentage of the target demand value is closer at 100%, processing for determination of restriction quantities classified by group corresponding to the aforementioned priority of order is executed, and the processing result is stored at the predetermined address of the main memory. Based on processing result, restriction control for some or all electric power consumption quantities for a plurality of electric devices takes place on a group basis.

Processing Flow of Sixth Embodiment

Figure 20:
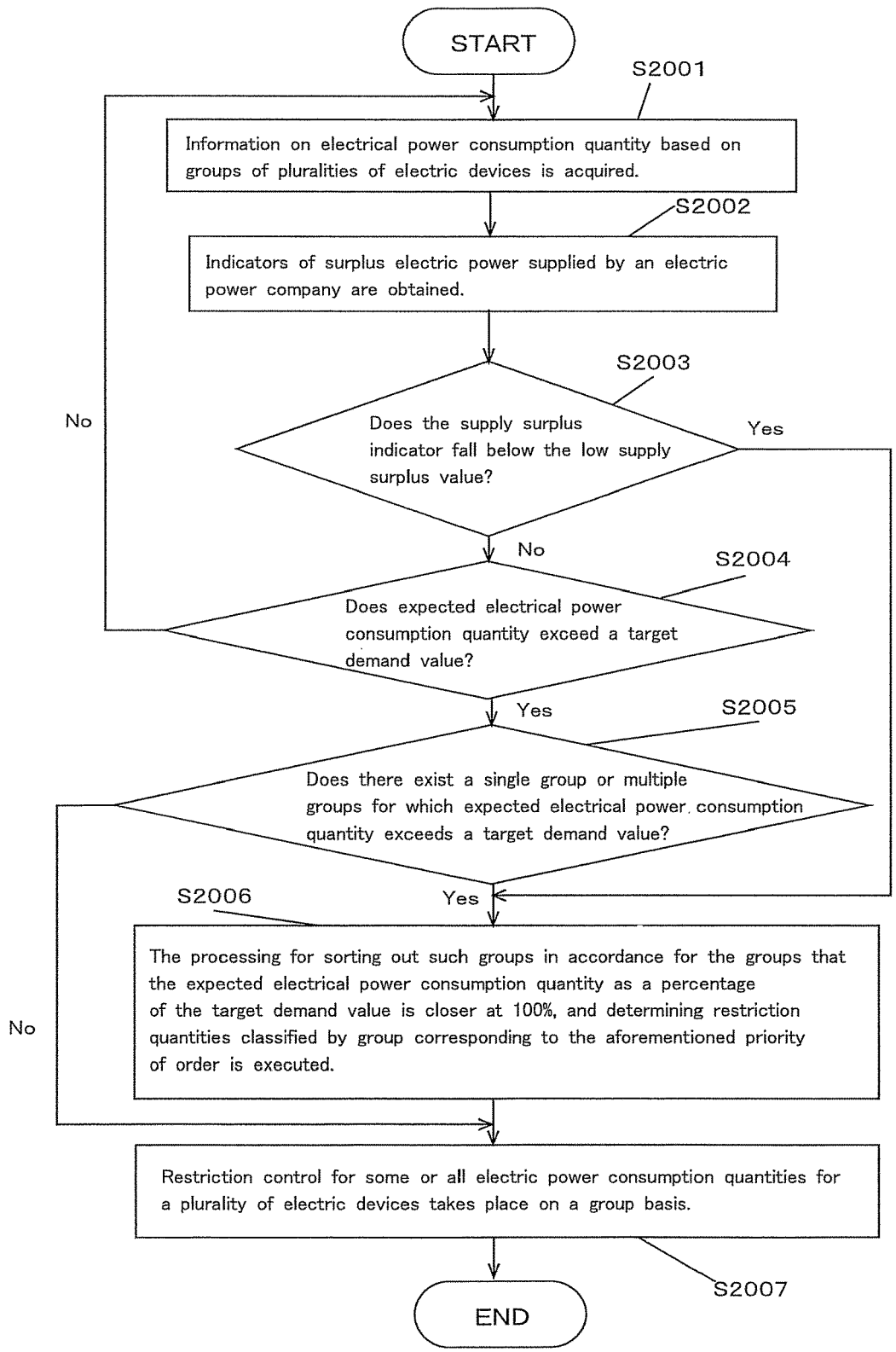
FIG. 20 is a diagram showing an example of progression of the process for controlling of the energy saving system of the sixth embodiment.

FIG. 20 is a diagram showing an example of progression of the process for controlling of the energy saving system of the sixth embodiment. Initially, information on electrical power consumption quantity based on groups of pluralities of electric devices is acquired (S2001). Indicators of surplus electric power supplied by an electric power company are obtained (S2002). Next, it is determined whether or not the supply surplus indicator falls below the low supply surplus value (S2003). In case that it has been determined that the supply surplus indicator does not fall below the low supply surplus value, the processing moves on to the step 2004. In case that it has been determined that the supply surplus indicator falls below the low supply surplus value, the processing moves on to the step 2006. It is determined whether or not expected electrical power consumption quantity of each group exceeds a target demand value on a group basis (S2004). It is determined whether or not the expected electrical power consumption quantity of each group does not the target demand value, the processing returns to the step 2001. In case that it has been determined that the expected electrical power consumption quantity of each group exceeds the target demand value, the processing moves on to the step 2005. Next, processing for determination of whether there exists a single group or multiple groups for which the expected electrical power consumption quantity exceeds the target demand value is executed (S2005). In case that it is determined that there exists a single such group, the processing moves on to the step 2007. In case that it is determined that there exist multiple such groups, the processing moves on to the step 2006. The processing for sorting out such groups in accordance for the groups that the expected electrical power consumption quantity as a percentage of the target demand value is closer at 100%, and determining restriction quantities classified by group corresponding to the aforementioned priority of order is executed (S2006). Next, restriction control for some or some or all electric power consumption quantities of a plurality of electric devices takes place on a group basis (S1807).

Brief Description of Effects of Sixth Embodiment

In addition to the effect of the first embodiment, the energy saving system of the sixth embodiment makes it possible to select electric devices for which energy saving control is implemented in accordance for the groups whose target achievement rate is low. Through such control, it is possible to encourage users to undertake efficient energy saving actions.

What is claimed is:

1. An energy saving system, comprising:
   a memory that includes computer-readable instructions; and
   a processor that is configured to execute the computer-readable instructions to:
   acquire electric power consumption quantity information corresponding to electric power that is consumed by a plurality of electronic devices respectively located in a plurality of single entities including first and second single entities, each of the plurality of single entities having only a single account for electric bills;
   have a target electric power demand value for prospective electric power that is scheduled to be consumed by the plurality of electronic devices respectively located in each of the plurality of single entities; and
   acquire a surplus electric power indicator corresponding to surplus electric power supplied by a single electric power supply company which supplies the electric power to the plurality of single entities within a predetermined region, wherein the processor is configured to obtain the surplus electric power indicator based on a maximum prospective electric power consumption in the predetermined region and a maximum scheduled electric power supply by the single electric power supply company, wherein the processor is configured to obtain a prospective device electric power consumption consumed by the plurality of electronic devices respectively located in each of the plurality of single entities in the future based on the electric power consumption quantity information and the target electric power demand value, when the processor determines that the surplus electric power indicator is lower than a first threshold and determines that a ratio of the prospective device electric power consumption and the target electric power demand value in the first single entity is larger than a second threshold, the processor is configured to restrict the electric power consumption of some of the plurality of electronic devices respectively located in the first single entity, when the processor determines that the surplus electric power indicator is lower than the first threshold and determines that a ratio of the prospective device electric power consumption and the target electric power demand value in the second single entity is equal to or smaller than the second threshold, the processor is configured to permit the electric power consumption without any energy consumption restriction of the plurality of electronic devices respectively located in the second single entity, and when the processor determines that the surplus electric power indicator is lower than the first threshold and determines that the ratio of the prospective device electric power consumption and the target electric power demand value in the first single entity is larger than the second threshold, the processor is configured to permit the electric power consumption without any energy consumption restriction of one of the plurality of electronic devices respectively located in the first single entity so that the one of the plurality of electronic devices respectively located in the first single entity always maintains an ON state.

2. The energy saving system according to claim 1, wherein the processor is configured to have a first control rule in which when a value of the surplus electric power indicator is lowered, a supply restriction level of the electric power consumed by all or some of the plurality of electronic devices increases.

3. The energy saving system according to claim 1, wherein the processor is configured to have a second control rule in which when a percentage of the prospective device electric power consumption of the plurality of electronic devices in the target electric power demand value of the plurality of electronic devices increases toward 100% in each of the plurality of single entities, a supply restriction level of the electric power consumed by all or some of the plurality of electronic devices increases in each of the plurality of single entities.

4. The energy saving system according to claim 1, wherein the target electric power demand value is configured with a plurality of target electric power demand values in each of the plurality of single entities, the plurality of electric devices are divided into a plurality of groups which respectively correspond to the plurality of target electric power demand values in each of the plurality of single entities, and the processor is configured to control each of the plurality of groups based on each of the plurality of target electric power demand values.

5. The energy saving system according to claim 4, wherein the processor is configured to restrict the electric power consumed by the plurality of groups based on an order of priority such that the greater the electric power consumed by one of the plurality of groups, the greater a supply restriction level of the electric power supplied to the one of the plurality of groups than the other of the plurality of groups.

6. The energy saving system according to claim 4, wherein the processor is configured to restrict the electric power consumed by the plurality of groups based on an order of priority such that the closer a percentage of the prospective device electric power consumption of one of the plurality of groups in corresponding one of the target electric power demand values is to 100%, the greater a supply restriction level of the electric power supplied to the one of the plurality of groups than the other of the plurality of groups.

7. An energy saving method of an energy saving system, the energy saving system has:
a memory that includes computer-readable instructions; and
a processor that is configured to execute the computer-readable instructions, the method comprising executing on the processor the steps of:
acquiring electric power consumption quantity information corresponding to electric power that is consumed by a plurality of electronic devices respectively located in a plurality of single entities including first and second single entities, each of the plurality of single entities having only a single account for electric bills;
having a target electric power demand value for prospective electric power that is scheduled to be consumed by the plurality of electronic devices respectively located in each of the plurality of single entities;
acquiring a surplus electric power indicator corresponding to surplus electric power supplied by a single electric power supply company which supplies the electric power to the plurality of single entities within a predetermined region; and
obtaining the surplus electric power indicator based on a maximum prospective electric power consumption in the predetermined region and a maximum scheduled electric power supply by the single electric power supply company,
wherein the processor is configured to obtain a prospective device electric power consumption consumed by the plurality of electronic devices respectively located in each of the plurality of single entities in the future based on the electric power consumption quantity information and the target electric power demand value,
when the processor determines that the surplus electric power indicator is lower than a first threshold and determines that a ratio of the prospective device electric power consumption and the target electric power demand value in the first single entity is larger than a second threshold, the processor is configured to restrict the electric power consumption of some of the plurality of electronic devices respectively located in the first single entity, when the processor determines that the surplus electric power indicator is lower than the first threshold and determines that a ratio of the prospective device electric power consumption and the target electric power demand value in the second single entity is equal to or smaller than the second threshold, the processor is configured to permit the electric power consumption without any energy consumption restriction of the plurality of electronic devices respectively located in the second single entity, and when the processor determines that the surplus electric power indicator is lower than the first threshold and determines that the ratio of the prospective device electric power consumption and the target electric power demand value in the first single entity is larger than the second threshold, the processor is configured to permit the electric power consumption without any energy consumption restriction of one of the plurality of electronic devices respectively located in the first single entity so that the one of the plurality of electronic devices respectively located in the first single entity always maintains an ON state.

8. The energy saving method according to claim 7, wherein the method executes on the processor a first control rule in which when a value of the surplus electric power indicator is lowered, a supply restriction level of the electric power consumed by all or some of the plurality of electronic devices increases.

9. The energy saving method according to claim 7, wherein the method executes on the processor a second control rule in which when a percentage of the prospective device electric power consumption of the plurality of electronic devices in the target electric power demand value of the plurality of electronic devices increases toward 100% in each of the plurality of single entities, a supply restriction level of the electric power consumed by all or some of the plurality of electronic devices increases in each of the plurality of single entities.

10. The energy saving method according to claim 7, wherein the target electric power demand value is configured with a plurality of target electric power demand values in each of the plurality of single entities, the plurality of electric devices are divided into a plurality of groups which respectively correspond to the plurality of target electric power demand values in each of the plurality of single entities, and the method executes on the processor the step of controlling each of the plurality of groups based on each of the plurality of target electric power demand values.

11. The energy saving method according to claim 10, wherein the method executes on the processor an electricity-consumption-dependent control substep in which the electric power consumed by the plurality of groups is restricted based on an order of priority such that the greater the electric power consumed by one of the plurality of groups, the greater a supply restriction level of the electric power supplied to the one of the plurality of groups than the other of the plurality of groups.

12. The energy saving method according to claim 10, wherein the method executes on the processor a target-achievement-rate-dependent control substep in which the electric power consumed by the plurality of groups is restricted based on an order of priority such that the closer a percentage of the prospective device electric power consumption of one of the plurality of groups in corresponding one of the target electric power demand values is to 100%, the greater a supply restriction level of the electric power supplied to the one of the plurality of groups than the other of the plurality of groups.

13. An energy saving computer program product embodying computer readable instructions stored on a non-transitory computer-readable medium for causing a computer to execute a process by a processor so as to perform the steps:

acquiring electric power consumption quantity information corresponding to electric power that is consumed by a plurality of electronic devices respectively located in a plurality of single entities including first and second single entities, each of the plurality of single entities having only a single account for electric bills;

having a target electric power demand value for prospective electric power that is scheduled to be consumed by the plurality of electronic devices respectively located in each of the plurality of single entities;

acquiring a surplus electric power indicator corresponding to surplus electric power supplied by a single electric power supply company which supplies the electric power to the plurality of single entities within a predetermined region; and obtaining the surplus electric power indicator based on a maximum prospective electric power consumption in the predetermined region and a maximum scheduled electric power supply by the single electric power supply company, wherein the processor is configured to obtain a prospective device electric power consumption consumed by the plurality of electronic devices respectively located in each of the plurality of single entities in the future based on the electric power consumption quantity information and the target electric power demand value, when the processor determines that the surplus electric power indicator is lower than a first threshold and determines that a ratio of the prospective device electric power consumption and the target electric power demand value in the first single entity is larger than a second threshold, the processor is configured to restrict the electric power consumption of the plurality of electronic devices respectively located in the first single entity, when the processor determines that the surplus electric power indicator is lower than the first threshold and determines that a ratio of the prospective device electric power consumption and the target electric power demand value in the second single entity is equal to or smaller than the second threshold, the processor is configured to permit the electric power consumption without any energy consumption restriction of the plurality of electronic devices respectively located in the second single entity, and when the processor determines that the surplus electric power indicator is lower than the first threshold and determines that the ratio of the prospective device electric power consumption and the target electric power demand value in the first single entity is larger than the second threshold, the processor is configured to permit the electric power consumption without any energy consumption restriction of one of the plurality of electronic devices respectively located in the first single entity so that the one of the plurality of electronic devices respectively located in the first single entity always maintains an ON state.

14. The energy saving computer program product according to claim 13, wherein the energy saving computer program product causes the computer to execute a first control rule in which when a value of the surplus electric power indicator is lowered, a supply restriction level of the electric power consumed by all or some of the plurality of electronic devices increases.

15. The energy saving computer program product according to claim 13, wherein the energy saving computer program product causes the computer to execute a second control rule in which when a percentage of the prospective device electric power consumption of the plurality of electronic devices in the target electric power demand value of the plurality of electronic devices increases toward 100% in each of the plurality of single entities, a supply restriction level of the electric power consumed by all or some of the plurality of electronic devices increases in each of the plurality of single entities.

16. The energy saving computer program product according to claim 13, wherein the target electric power demand value is configured with a plurality of target electric power demand values in each of the plurality of single entities, the plurality of electric devices are divided into a plurality of groups which respectively correspond to the plurality of target electric power demand values in each of the plurality of single entities, and the energy saving computer program product causes the computer to execute the step of controlling each of the plurality of groups based on each of the plurality of target electric power demand values.

17. The energy saving computer program product according to claim 16, wherein the energy saving computer program product causes the computer to execute an electricity-consumption-dependent control substep in which the electric power consumed by the plurality of groups is restricted based on an order of priority such that the greater the electric power consumed by one of the plurality of groups, the greater a supply restriction level of the electric power supplied to the one of the plurality of groups than the other of the plurality of groups.

18. The energy saving computer program product according to claim 16, wherein the energy saving computer program product causes the computer to execute a target-achievement-rate-dependent control substep in which the electric power consumed by the plurality of groups is restricted based on an order of priority such that the closer a percentage of the prospective device electric power consumption of one of the plurality of groups in corresponding one of the target electric power demand values is to 100%, the greater a supply restriction level of the electric power supplied to the one of the plurality of groups than the other of the plurality of groups.

* * * * *